(12) United States Patent
Waltermire et al.

(10) Patent No.: US 11,453,541 B2
(45) Date of Patent: Sep. 27, 2022

(54) BOX LINER

(71) Applicant: Pratt Retail Specialties, LLC, Brookhaven, GA (US)

(72) Inventors: Jamie Waltermire, Peachtree City, GA (US); Paul Ott, Atlanta, GA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

(21) Appl. No.: 17/079,437

(22) Filed: Oct. 24, 2020

(65) Prior Publication Data

US 2021/0039869 A1 Feb. 11, 2021

Related U.S. Application Data

(60) Continuation of application No. 16/526,511, filed on Jul. 30, 2019, now Pat. No. 10,882,681, which is a division of application No. 15/482,186, filed on Apr. 7, 2017, now Pat. No. 10,800,595.

(51) Int. Cl.
*B65D 81/38* (2006.01)
*B65D 43/16* (2006.01)
*B65D 30/20* (2006.01)

(52) U.S. Cl.
CPC ......... *B65D 81/3813* (2013.01); *B65D 31/10* (2013.01); *B65D 43/163* (2013.01); *B65D 81/386* (2013.01); *B65D 81/3897* (2013.01)

(58) Field of Classification Search
CPC .............. B65D 81/3813; B65D 81/386; B65D 81/3897
USPC ........................................................ 493/100
See application file for complete search history.

(56) References Cited

U.S. PATENT DOCUMENTS

| 265,985 A | 10/1882 | Seabury |
| 1,061,531 A | 5/1913 | Emmons |
| 1,150,105 A | 8/1915 | Emmons |
| 1,527,167 A | 2/1925 | Birdseye |
| 1,677,565 A | 7/1928 | Oppenheim |
| 1,682,410 A | 8/1928 | Oppenheim |
| 1,747,980 A | 2/1930 | Kondolf |

(Continued)

FOREIGN PATENT DOCUMENTS

| CA | 2019104 | 12/1991 |
| CA | 2145953 | 10/1996 |

(Continued)

OTHER PUBLICATIONS

US 10,562,676 B2, 02/2020, Waltermire et al. (withdrawn)

(Continued)

*Primary Examiner* — Chelsea E Stinson
(74) *Attorney, Agent, or Firm* — Taylor English Duma LLP

(57) ABSTRACT

An insulated box assembly includes a box including a pair of opposing side box panels, a pair of opposing main box panels, and a bottom box panel, the box defining an internal box cavity with a box opening defined opposite from the bottom box panel; and an insulated liner positioned within the internal box cavity, the insulated liner including a pair of opposing main liner panels and a pair of opposing side liner panels, the pair of opposing main liner panels and the pair of opposing side liner panels defined by a single blank liner panel including a blank sheet and an insulation batt, the insulation batt positioned between the blank sheet and the box.

19 Claims, 11 Drawing Sheets

(56) References Cited

U.S. PATENT DOCUMENTS

| | | |
|---|---|---|
| 1,753,813 A | 4/1930 | Washburn |
| 1,868,996 A | 7/1932 | Sharp |
| 1,896,393 A | 2/1933 | Devine |
| 1,899,892 A | 2/1933 | D'Este et al. |
| 1,930,680 A | 10/1933 | Hinton |
| 1,935,923 A | 11/1933 | Thoke |
| 1,937,263 A | 11/1933 | Bubb |
| 1,942,917 A | 1/1934 | D'Este et al. |
| 1,954,013 A | 4/1934 | Lilienfield |
| 2,018,519 A | 10/1935 | Hall |
| 2,070,747 A | 2/1937 | Ostrom |
| 2,116,513 A | 5/1938 | Frankenstein |
| 2,148,454 A | 2/1939 | Gerard |
| 2,165,327 A | 7/1939 | Zalkind |
| 2,289,060 A | 7/1942 | Merkle |
| 2,293,361 A | 8/1942 | Roberts |
| 2,360,806 A | 10/1944 | Van Rosen |
| 2,386,905 A | 10/1945 | Meitzen |
| 2,389,601 A | 11/1945 | De Witt |
| 2,485,643 A | 10/1949 | Norquist |
| 2,554,004 A | 5/1951 | Bergstein |
| 2,632,311 A | 3/1953 | Sullivan |
| 2,650,016 A | 8/1953 | McMillan |
| 2,753,102 A | 7/1956 | Paige |
| 2,867,035 A | 1/1959 | Patterson |
| 2,899,103 A | 8/1959 | Ebert |
| 2,927,720 A | 3/1960 | Adams |
| 2,986,324 A | 5/1961 | Anderson, Jr. |
| 2,987,239 A | 6/1961 | Atwood |
| 3,003,680 A | 10/1961 | Wilcox, Jr. et al. |
| 3,029,008 A | 4/1962 | Membrino |
| 3,031,121 A | 4/1962 | Chase |
| 3,065,895 A | 11/1962 | Lipschutz |
| 3,096,879 A | 7/1963 | Schumacher |
| 3,097,782 A | 7/1963 | Koropatkin et al. |
| 3,182,913 A | 5/1965 | Brian |
| 3,193,176 A | 7/1965 | Gullickson et al. |
| 3,194,471 A | 7/1965 | Murphy |
| 3,206,103 A | 9/1965 | Bixler |
| 3,222,843 A | 12/1965 | Schneider |
| 3,236,206 A | 2/1966 | Willinger |
| 3,282,411 A | 11/1966 | Jardine |
| 3,286,825 A | 11/1966 | Laas |
| 3,335,941 A | 8/1967 | Gatward |
| 3,371,462 A | 3/1968 | Nordkvist et al. |
| 3,375,934 A | 4/1968 | Bates |
| 3,399,818 A | 9/1968 | Stegner |
| 3,420,363 A | 1/1969 | Blickensderfer |
| 3,435,736 A | 4/1969 | Reiche |
| 3,465,948 A | 9/1969 | Boyer |
| 3,503,550 A | 3/1970 | Main et al. |
| 3,551,945 A | 1/1971 | Eyberg et al. |
| 3,670,948 A | 6/1972 | Berg |
| 3,703,383 A | 11/1972 | Kuchenbecker |
| 3,734,336 A | 5/1973 | Rankow et al. |
| 3,747,743 A | 7/1973 | Hoffman, Jr. |
| 3,749,299 A | 7/1973 | Ingle |
| 3,836,044 A | 9/1974 | Tilp et al. |
| 3,843,038 A | 10/1974 | Sax |
| 3,880,341 A | 4/1975 | Bamburg et al. |
| 3,887,743 A | 6/1975 | Lane |
| 3,890,762 A | 6/1975 | Ernst et al. |
| 3,945,561 A | 3/1976 | Strebelle |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,169,540 A | 10/1979 | Larsson et al. |
| 4,170,304 A | 10/1979 | Huke |
| 4,211,267 A | 7/1980 | Skovgaard |
| 4,213,310 A | 7/1980 | Buss |
| 4,335,844 A | 6/1982 | Egli |
| 4,342,416 A | 8/1982 | Philips |
| 4,380,314 A | 4/1983 | Langston, Jr. et al. |
| D270,041 S | 8/1983 | Vestal |
| 4,396,144 A | 8/1983 | Gutierrez et al. |
| 4,418,864 A | 12/1983 | Neilsen |
| 4,488,623 A | 12/1984 | Linnell, II et al. |
| 4,509,645 A | 4/1985 | Hotta |
| 4,679,242 A | 7/1987 | Brockhaus |
| 4,682,708 A | 7/1987 | Pool |
| 4,711,390 A | 12/1987 | Andrews et al. |
| 4,797,010 A | 1/1989 | Coelho |
| 4,819,793 A | 4/1989 | Willard et al. |
| 4,828,133 A | 5/1989 | Hougendobler |
| 4,830,282 A | 5/1989 | Knight, Jr. |
| 4,889,252 A | 12/1989 | Rockom et al. |
| 4,930,903 A | 6/1990 | Mahoney |
| 4,989,780 A | 2/1991 | Foote et al. |
| 5,016,813 A | 5/1991 | Simons |
| 5,020,481 A | 6/1991 | Nelson |
| 5,062,527 A | 11/1991 | Westerman |
| 5,094,547 A | 3/1992 | Graham |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,185,904 A | 2/1993 | Rogers et al. |
| 5,226,542 A | 7/1993 | Boecker et al. |
| 5,230,450 A | 7/1993 | Mahvi et al. |
| 5,263,339 A | 11/1993 | Evans |
| 5,358,757 A | 10/1994 | Robinei et al. |
| 5,372,429 A | 12/1994 | Beaver, Jr. et al. |
| 5,417,342 A | 5/1995 | Hutchison |
| 5,418,031 A * | 5/1995 | English .................. B32B 27/12 428/74 |
| 5,441,170 A | 8/1995 | Bane, III |
| 5,454,471 A | 10/1995 | Norvell |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,507,429 A | 4/1996 | Arlin |
| 5,511,667 A | 4/1996 | Carder |
| 5,512,345 A | 4/1996 | Tsutsumi et al. |
| 5,516,580 A | 5/1996 | Frenette et al. |
| 5,562,228 A | 10/1996 | Ericson |
| 5,573,119 A | 11/1996 | Luray |
| 5,596,880 A | 1/1997 | Welker et al. |
| 5,601,232 A | 2/1997 | Greenlee |
| 5,613,610 A | 3/1997 | Bradford |
| 5,615,795 A | 4/1997 | Tipps |
| 5,638,978 A | 6/1997 | Cadiente |
| 5,775,576 A | 7/1998 | Stone |
| 5,842,571 A | 12/1998 | Rausch |
| 5,906,290 A | 5/1999 | Haberkorn |
| 5,996,366 A | 12/1999 | Renard |
| 6,003,719 A | 12/1999 | Steward, III |
| D421,457 S | 3/2000 | Crofton |
| 6,041,958 A | 3/2000 | Tremelo |
| 6,048,099 A | 4/2000 | Muffett et al. |
| 6,050,410 A | 4/2000 | Quirion |
| 6,050,412 A | 4/2000 | Clough et al. |
| 6,138,902 A | 10/2000 | Welch |
| 6,164,526 A | 12/2000 | Dalvey |
| 6,168,040 B1 | 1/2001 | Sautner et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |
| 6,247,328 B1 | 6/2001 | Mogil |
| 6,295,830 B1 | 10/2001 | Newman |
| 6,295,860 B1 | 10/2001 | Sakairi et al. |
| 6,296,134 B1 | 10/2001 | Cardinale |
| 6,308,850 B1 | 10/2001 | Coom et al. |
| 6,325,281 B1 | 12/2001 | Grogan |
| 6,364,199 B1 | 4/2002 | Rose |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,582,124 B2 | 6/2003 | Mogil |
| 6,618,868 B2 | 9/2003 | Minnick |

(56) References Cited

U.S. PATENT DOCUMENTS

| | | |
|---|---|---|
| 6,688,133 B1 | 2/2004 | Donefrio |
| 6,725,783 B2 | 4/2004 | Sekino |
| 6,726,017 B2 | 4/2004 | Maresh et al. |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,899,229 B2 | 5/2005 | Dennison et al. |
| 6,910,582 B2 | 6/2005 | Lantz |
| 6,913,389 B2 | 7/2005 | Kannankeril et al. |
| 6,971,539 B1 | 12/2005 | Abbe |
| 7,000,962 B2 | 2/2006 | Le |
| 7,019,271 B2 | 3/2006 | Wnek et al. |
| 7,070,841 B2 | 7/2006 | Benim et al. |
| 7,094,192 B2 | 8/2006 | Schoenberger et al. |
| 7,140,773 B2 | 11/2006 | Becker et al. |
| D534,797 S | 1/2007 | El-Afandi |
| D545,189 S | 6/2007 | El-Afandi |
| 7,225,632 B2 | 6/2007 | Derifield |
| 7,225,970 B2 | 6/2007 | Philips |
| 7,229,677 B2 | 6/2007 | Miller |
| D546,679 S | 7/2007 | El-Afandi |
| 7,264,147 B1 | 9/2007 | Benson et al. |
| 7,270,358 B2 | 9/2007 | Hirsch |
| 7,392,931 B2 | 7/2008 | Issler |
| 7,452,316 B2 | 11/2008 | Cals et al. |
| D582,676 S | 12/2008 | Rothschild |
| 7,484,623 B2 | 2/2009 | Goodrich |
| 7,597,209 B2 | 10/2009 | Rothschild et al. |
| 7,607,563 B2 | 10/2009 | Hanna et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman et al. |
| 7,845,508 B2 | 12/2010 | Rothschild et al. |
| 7,870,992 B2 | 1/2011 | Schille et al. |
| 7,909,806 B2 | 3/2011 | Goodman et al. |
| 7,971,720 B2 | 7/2011 | Minkler |
| 3,118,177 A1 | 2/2012 | Drapela et al. |
| 8,209,995 B2 | 7/2012 | Kieling et al. |
| 8,210,353 B2 | 7/2012 | Epicureo |
| 8,343,024 B1 | 1/2013 | Contanzo, Jr. et al. |
| 8,365,943 B2 | 2/2013 | Bentley |
| 8,465,404 B2 | 6/2013 | Hadley |
| 8,567,662 B2 | 10/2013 | Costanzo, Jr. |
| 8,579,183 B2 | 11/2013 | Belfort et al. |
| 8,596,520 B2 | 12/2013 | Scott |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| D710,692 S | 8/2014 | Genender |
| 8,795,470 B2 | 8/2014 | Henderson et al. |
| 8,875,983 B2 | 11/2014 | Lenhard et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,394,633 B2 | 7/2016 | Shimotsu et al. |
| D764,903 S | 8/2016 | Sanfilippo et al. |
| 9,408,445 B2 | 8/2016 | Mogil et al. |
| 9,429,350 B2 | 8/2016 | Chapman, Jr. |
| 9,499,294 B1 | 11/2016 | Contanzo, Jr. |
| 9,550,618 B1 | 1/2017 | Jobe |
| 9,605,382 B2 | 3/2017 | Virtanen |
| 9,611,067 B2 | 4/2017 | Collison |
| 9,635,916 B2 | 5/2017 | Bezich et al. |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,680 B2 | 3/2018 | Shi et al. |
| 9,908,684 B2 | 3/2018 | Collison |
| 9,920,517 B2 | 3/2018 | Sollie et al. |
| 9,950,830 B2 | 4/2018 | De Lesseux et al. |
| 9,981,797 B2 | 5/2018 | Aksan et al. |
| 10,046,901 B1 | 8/2018 | Jobe |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,273,073 B2 | 4/2019 | Collison |
| 10,357,936 B1 | 7/2019 | Wincent et al. |
| 10,435,194 B2 | 10/2019 | Sollie et al. |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 10,583,977 B2 | 3/2020 | Collison et al. |
| 10,604,304 B2 | 3/2020 | Waltermire et al. |
| D881,690 S | 4/2020 | Smalley |
| 10,661,941 B2 | 5/2020 | Genender et al. |
| 10,800,595 B2 | 10/2020 | Waltermire et al. |
| 10,843,840 B2 | 11/2020 | Sollie et al. |
| 10,858,141 B2 | 12/2020 | Sollie et al. |
| 10,882,681 B2 | 1/2021 | Waltermire et al. |
| 10,882,682 B2 | 1/2021 | Collison et al. |
| 10,882,683 B2 | 1/2021 | Collison et al. |
| 10,882,684 B2 | 1/2021 | Sollie et al. |
| 10,926,939 B2 | 2/2021 | Collison et al. |
| 10,941,977 B2 | 3/2021 | Waltermire et al. |
| 10,947,025 B2 | 3/2021 | Sollie et al. |
| 10,954,057 B2 | 3/2021 | Waltermire et al. |
| 10,954,058 B2 | 3/2021 | Sollie et al. |
| 11,027,875 B2 | 6/2021 | Sollie et al. |
| 11,059,652 B2 | 7/2021 | Sollie et al. |
| 11,066,228 B2 | 7/2021 | Sollie et al. |
| 11,117,731 B2 | 9/2021 | Waltermire et al. |
| 11,124,354 B2 | 9/2021 | Waltermire et al. |
| D934,064 S | 10/2021 | Satnick |
| 11,137,198 B2 | 10/2021 | Waltermire et al. |
| 11,148,870 B2 | 10/2021 | Collison et al. |
| 11,203,458 B2 | 12/2021 | Sollie et al. |
| 11,214,427 B2 | 1/2022 | Collison et al. |
| 11,215,393 B2 | 1/2022 | Waltermire et al. |
| 11,230,404 B2 | 1/2022 | Sollie et al. |
| 11,247,806 B2 | 2/2022 | Sollie et al. |
| 11,255,596 B2 | 2/2022 | Waltermire et al. |
| 11,261,017 B2 | 3/2022 | Waltermire et al. |
| 11,267,641 B2 | 3/2022 | Collison et al. |
| 11,286,099 B2 | 3/2022 | Sollie et al. |
| 11,325,772 B2 | 5/2022 | Sollie et al. |
| 2001/0010312 A1 | 8/2001 | Mogil |
| 2002/0020188 A1 | 2/2002 | Sharon et al. |
| 2002/0064318 A1 | 5/2002 | Malone et al. |
| 2002/0162767 A1 | 11/2002 | Ohtsubo |
| 2003/0145561 A1 | 8/2003 | Cals et al. |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0117817 A1 | 6/2005 | Mogil et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0078720 A1 | 4/2006 | Toas et al. |
| 2006/0096978 A1 | 5/2006 | Lafferty et al. |
| 2006/0193541 A1 | 8/2006 | Norcom |
| 2006/0243784 A1 | 11/2006 | Glaser et al. |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price et al. |
| 2008/0095959 A1 | 4/2008 | Warner et al. |
| 2008/0135564 A1 | 6/2008 | Romero |
| 2008/0148245 A1 | 6/2008 | Gutz et al. |

(56) References Cited

U.S. PATENT DOCUMENTS

| | | |
|---|---|---|
| 2008/0173703 A1 | 7/2008 | Westerman et al. |
| 2008/0190940 A1 | 8/2008 | Scott |
| 2008/0203090 A1 | 8/2008 | Dickinson |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0214142 A1 | 8/2009 | Bossel et al. |
| 2009/0283578 A1 | 11/2009 | Miller |
| 2009/0288791 A1 | 11/2009 | Hammer et al. |
| 2010/0001056 A1 | 1/2010 | Chandaria |
| 2010/0006630 A1* | 1/2010 | Humphries ............... B32B 3/02 229/117.27 |
| 2010/0062921 A1 | 3/2010 | Veiseh |
| 2010/0072105 A1 | 3/2010 | Glaser et al. |
| 2010/0139878 A1 | 6/2010 | Clemente |
| 2010/0151164 A1 | 6/2010 | Grant et al. |
| 2010/0219232 A1 | 9/2010 | Smith |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1 | 11/2010 | Hadley |
| 2010/0314397 A1 | 12/2010 | Williams et al. |
| 2010/0314437 A1 | 12/2010 | Dowd |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0026215 A1 | 1/2013 | Lenhard et al. |
| 2013/0112694 A1 | 5/2013 | Bentley |
| 2013/0112695 A1 | 5/2013 | Hall |
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0300026 A1 | 10/2014 | Taccolini |
| 2014/0319018 A1 | 10/2014 | Collison |
| 2014/0367393 A1 | 12/2014 | Ranade |
| 2015/0110423 A1 | 4/2015 | Fox et al. |
| 2015/0111011 A1 | 4/2015 | Hoekstra et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0255009 A1 | 9/2015 | Akhter et al. |
| 2015/0259126 A1 | 9/2015 | McGoff et al. |
| 2015/0284131 A1 | 10/2015 | Genender et al. |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0264294 A1 | 9/2016 | Bacon |
| 2016/0304267 A1 | 10/2016 | Aksan |
| 2016/0318648 A1 | 11/2016 | Kuninobu |
| 2016/0325915 A1 | 11/2016 | Aksan |
| 2017/0015080 A1 | 1/2017 | Collison et al. |
| 2017/0021961 A1 | 1/2017 | Humphrey et al. |
| 2017/0043937 A1 | 2/2017 | Lantz |
| 2017/0121052 A1 | 5/2017 | Morimoto |
| 2017/0144792 A1 | 5/2017 | Block |
| 2017/0198959 A1 | 7/2017 | Morris |
| 2017/0225870 A1 | 8/2017 | Collison |
| 2017/0233134 A9 | 8/2017 | Grajales et al. |
| 2017/0233165 A1 | 8/2017 | Kuhn |
| 2017/0283157 A1 | 10/2017 | Jobe |
| 2017/0305639 A1 | 10/2017 | Kuhn et al. |
| 2017/0320653 A1 | 11/2017 | Mog et al. |
| 2017/0334622 A1 | 11/2017 | Menzel, Jr. |
| 2017/0341847 A1 | 11/2017 | Chase et al. |
| 2017/0361973 A1 | 12/2017 | Padilla |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0319569 A1 | 11/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0009946 A1 | 1/2019 | Nixon et al. |
| 2019/0032991 A1 | 1/2019 | Waltermire et al. |
| 2019/0047775 A1 | 2/2019 | Waltermire et al. |
| 2019/0144155 A1 | 5/2019 | Geng et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0071056 A1 | 3/2020 | Henderson et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148453 A1 | 5/2020 | Sollie et al. |
| 2020/0283188 A1 | 9/2020 | Sollie et al. |
| 2020/0346816 A1 | 11/2020 | Sollie et al. |
| 2020/0346841 A1 | 11/2020 | Sollie et al. |
| 2021/0039870 A1 | 2/2021 | Sollie et al. |
| 2021/0039871 A1 | 2/2021 | Sollie et al. |
| 2021/0070527 A1 | 3/2021 | Sollie et al. |
| 2021/0070529 A1 | 3/2021 | Sollie et al. |
| 2021/0070530 A1 | 3/2021 | Sollie et al. |
| 2021/0078755 A1 | 3/2021 | Sollie et al. |
| 2021/0101734 A1 | 4/2021 | Collison et al. |
| 2021/0101735 A1 | 4/2021 | Collison et al. |
| 2021/0101736 A1 | 4/2021 | Waltermire et al. |
| 2021/0101737 A1 | 4/2021 | Waltermire et al. |
| 2021/0102746 A1 | 4/2021 | Waltermire et al. |
| 2021/0155367 A1 | 5/2021 | Sollie et al. |
| 2021/0163210 A1 | 6/2021 | Waltermire et al. |
| 2021/0179313 A1 | 6/2021 | Sollie et al. |
| 2021/0179337 A1 | 6/2021 | Sollie et al. |
| 2021/0347553 A1 | 11/2021 | Sollie et al. |
| 2022/0017260 A1 | 1/2022 | Sollie et al. |
| 2022/0024634 A1 | 1/2022 | Sollie et al. |
| 2022/0024635 A1 | 1/2022 | Sollie et al. |
| 2022/0026140 A1 | 1/2022 | Waltermire et al. |
| 2022/0026141 A1 | 1/2022 | Waltermire et al. |

(56) References Cited

U.S. PATENT DOCUMENTS

| | | | |
|---|---|---|---|
| 2022/0033167 A1 | 2/2022 | Collison et al. |
| 2022/0081152 A1 | 3/2022 | Sollie et al. |
| 2022/0081186 A1 | 3/2022 | Waltermire et al. |
| 2022/0177216 A1 | 6/2022 | Sollie et al. |
| 2022/0251783 A1 | 8/2022 | Anagnostopoulos et al. |

FOREIGN PATENT DOCUMENTS

| | | |
|---|---|---|
| CN | 1073993 | 7/1993 |
| CN | 1503962 | 6/2004 |
| CN | 102264961 | 11/2011 |
| CN | 206494316 | 9/2017 |
| CN | 108001787 | 5/2018 |
| DE | 1897846 | 7/1964 |
| DE | 102011016500 | 10/2012 |
| DE | 202017103230 | 7/2017 |
| DE | 202017003908 | 10/2017 |
| DE | 202018101998 | 7/2019 |
| DE | 202019003407 | 11/2019 |
| EP | 0133539 | 2/1985 |
| EP | 0537058 | 4/1993 |
| EP | 2990196 | 3/2016 |
| EP | 3144248 | 3/2017 |
| EP | 3348493 | 7/2018 |
| EP | 3538708 | 1/2022 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2400096 | 5/2006 |
| GB | 2516490 | 1/2015 |
| GB | 2528289 | 1/2016 |
| JP | 51254557 | 10/1989 |
| JP | 2005139582 | 6/2005 |
| JP | 2005247329 | 9/2005 |
| JP | 2012126440 | 7/2012 |
| KR | 101730461 | 4/2017 |
| WO | 8807476 | 10/1988 |
| WO | 9726192 | 7/1997 |
| WO | 9932374 | 7/1999 |
| WO | 2001070592 | 9/2001 |
| WO | 2014147425 | 9/2014 |
| WO | 2016187435 A2 | 5/2016 |
| WO | 2016187435 A3 | 11/2016 |
| WO | 2017207974 | 12/2017 |
| WO | 2018089365 | 5/2018 |
| WO | 2018093586 | 5/2018 |
| WO | 2018227047 | 12/2018 |
| WO | 2019113453 | 6/2019 |
| WO | 2019125904 | 6/2019 |
| WO | 2019125906 | 6/2019 |
| WO | 2019226199 | 11/2019 |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,292,656 B2, 04/2022, Sollie et al. (withdrawn)
US D959,977 S, 08/2022, Sollie et al. (withdrawn)
Dave Carlson, FBA Updates Voluntary Standard For Recyclable Wax Alternatives, Aug. 14, 2013, Fiber Box Association (Year: 2013).*
Tera-Pak; Article entitled: "Insulated Shipping Containers", located at <http://www.tera-pak.com/>, accessed on Mar. 20, 2017, 3 pgs.
Duro Bag; Article entitled: "The Load and Fold Bag", accessed on May 24, 2017, copyrighted Apr. 2017, 3 pgs.
Images of Novolex bag, including an outer paper bag, a corrugated cardboard insert, and an inner foil-covered bubble-wrap bag, publicly available prior to May 9, 2017, 7 pgs.
Un Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
Greenblue; "Environmental Technical Briefs of Common Packaging Materials—Fiber-Based Materials", Sustainable Packaging Solution, 2009.
MP Global Products; Article entitled: "Thermopod mailer envelopes and Thermokeeper insulated box liners", located at <http://www.mhpn.com/product/thermopod_mailer_envelopes_and_thermokeeper_insulated_box_liners/packaging>, accessed on Aug. 30, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
Periwrap; Article entitled: "Insulated Solutions", located at <https://www.peri-wrap.com/insulation/>, accessed on Dec. 3, 2018, 9 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Waltermire, Jamie; Non-Final Office Action for U.S. Appl. No. 15/663,905, filed Jul. 31, 2017, dated Mar. 25, 2019, 66 pgs.
Waltermire, Jamie; Notice of Allowance for U.S. Appl. No. 15/663,905, filed Jul. 31, 2017, dated Nov. 4, 2019, 18 pgs.
Waltermire, Jamie; Requirement for Restriction/Election for U.S. Appl. No. 15/663,905, filed Jul. 31, 2017, dated Mar. 21, 2019, 8 pgs.
Waltermire, Jamie; Non-Final Office Action for U.S. Appl. No. 16/381,678, filed Apr. 11, 2019, dated Sep. 9, 2019, 50 pgs.
Waltermire, Jamie; Final Office Action for U.S. Appl. No. 16/381,678, filed Apr. 11, 2019, dated Dec. 30, 2019, 17 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Final Office Action for U.S. Appl. No. 16/381,678, filed Apr. 11, 2019, dated Jun. 16, 2020, 8 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/381,678, filed Apr. 11, 2019, dated Aug. 20, 2020, 21 pgs.
Waltermire, Jamie; Final Office Action for U.S. Appl. No. 16/381,678, filed Apr. 11, 2019, dated Oct. 19, 2020, 24 pgs.
Waltermire, Jamie; Requirement for Restriction/Election for U.S. Appl. No. 16/561,203, filed Sep. 5, 2019, dated Feb. 26, 2020, 5 pgs.
Waltermire, Jamie; Non-Final Office Action for U.S. Appl. No. 16/561,203, filed Sep. 5, 2019, dated May 6, 2020, 59 pgs.
Waltermire, Jamie; Final Office Action for U.S. Appl. No. 16/561,203, filed Sep. 5, 2019, dated Sep. 10, 2020, 25 pgs.
Waltermire, Jamie; Notice of Allowance for U.S. Appl. No. 16/561,203, filed Sep. 5, 2019, dated Nov. 3, 2020, 14 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Requirement for Restriction/Election for U.S. Appl. No. 16/689,407, filed Nov. 20, 2019, dated Oct. 29, 2020, 6 pgs.
Waltermire, Jamie; Non-Final Office Action for U.S. Appl. No. 16/689,407, filed Nov. 20, 2019, dated Jan. 8, 2021, 92 pgs.

(56) References Cited

OTHER PUBLICATIONS

Waltermire, Jamie; Requirement for Restriction/Election for U.S. Appl. No. 16/689,433, filed Nov. 20, 2019, dated Oct. 16, 2020, 6 pgs.
Sollie, Greg; Notice of Allowance for U.S. Appl. No. 15/845,545, filed Dec. 18, 2017, dated Jun. 19, 2019, 20 pgs.
Sollie, Greg; Corrected Notice of Allowance for U.S. Appl. No. 15/845,545, filed Dec. 18, 2017, dated Oct. 1, 2019, 7 pgs.
Sollie, Greg; Corrected Notice of Allowance for U.S. Appl. No. 15/845,545, filed Dec. 18, 2017, dated Oct. 31, 2019, 12 pgs.
Sollie, Greg; Non-Final Office Action for U.S. Appl. No. 15/845,545, filed Dec. 18, 2017, dated Mar. 5, 2019, 41 pgs.
Sollie, Greg; Restriction Requirement for U.S. Appl. No. 16/552,277, filed Aug. 27, 2019, dated Apr. 20, 2020, 7 pgs.
Sollie, Greg; Non-Final Office Action for U.S. Appl. No. 16/552,277, filed Aug. 27, 2019, dated Jun. 3, 2020, 68 pgs.
Sollie, Greg; Final Office Action for U.S. Appl. No. 16/552,277, filed Aug. 27, 2019, dated Aug. 7, 2020, 19 pgs.
Sollie, Greg; Corrected Notice of Allowance for U.S. Appl. No. 16/552,277, filed Aug. 27, 2019, dated Nov. 5, 2020, 9 pgs.
Sollie, Greg; Notice of Allowance for U.S. Appl. No. 16/552,277, filed Aug. 27, 2019, dated Aug. 31, 2020, 6 pgs.
Sollie, Greg; Corrected Notice of Allowance for U.S. Appl. No. 16/552,277, filed Aug. 27, 2019, dated Dec. 22, 2020, 7 pgs.
Sollie, Greg; Final Office Action for U.S. Appl. No. 15/845,540, filed Dec. 18, 2017, dated Oct. 30, 2019, 56 pgs.
Sollie, Greg; Non-Final Office Action for U.S. Appl. No. 15/845,540, filed Dec. 18, 2017, dated Feb. 19, 2020, 32 pgs.
Sollie, Greg; Final Office Action for U.S. Appl. No. 15/845,540, filed Dec. 18, 2017, dated Sep. 2, 2020, 28 pgs.
Sollie, Greg; Notice of Allowance for U.S. Appl. No. 15/845,540, filed Dec. 18, 2017, dated Sep. 17, 2020, 5 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Salazar Packaging; Article entitle: "Custom Packaging and Design", located at <https://salazarpackaging.com/custom-packaging-and-design/>, accessed on Sep. 28, 2017, 2 pgs.
Sollie, Greg; Non-Final Office Action for U.S. Appl. No. 15/845,540, filed Dec. 18, 2017, dated Apr. 2, 2019, 50 pgs.
Solie, Greg; Corrected Notice of Allowance for U.S. Appl. No. 15/845,540, filed Dec. 18, 2017, dated Dec. 21, 2020, 9 pgs.
Collison, Alan B.; Notice of Allowance for U.S. Appl. No. 15/677,738, filed Aug. 15, 2017, dated Jun. 19, 2019, 10 pgs.
Collison, Alan B.; Corrected Notice of Allowance for U.S. Appl. No. 15/677,738, filed Aug. 15, 2017, dated Jul. 15, 2019, 7 pgs.
CooLiner® Insulated Shipping Bags, available at <http://www/chem-tran.com/packaging/supplies/cooliner-insulated-shipping-bags.php>, accessed on Oct. 18, 2019, 4 pgs.
"Green Cell Foam Shipping Coolers", located at <https://www.greencellfoam.com/shipping-coolers>, accessed on Oct. 18, 2019, 4 pgs.
Waltermire, Jamie; Final Office Action for U.S. Appl. No. 16/530,045, filed Aug. 2, 2019, dated Nov. 24, 2020, 40 pgs.
Waltermire, Jamie; Corrected Notice of Allowance for U.S. Appl. No. 15/590,349, filed, May 9, 2017, dated Dec. 22, 2020, 9 pgs.
Sollie, Greg; Applicant-Initiated Interview Summary for U.S. Appl. No. 15/988,550, filed May 24, 2018, dated Dec. 24, 2020, 2 pgs.
Sollie, Greg; Non-Final Office Action for U.S. Appl. No. 16/530,052, filed Aug. 2, 2019, dated Dec. 18, 2020, 17 pgs.
Sollie, Greg; Corrected Notice of Allowance for U.S. Appl. No. 16/401,603, filed May 2, 2019, dated Nov. 24, 2020, 8 pgs.
Sollie, Greg; Final Office Action for U.S. Appl. No. 16/408,981, filed May 10, 2019, dated Dec. 29, 2020, 22 pgs.
Sollie, Greg; Requirement for Restriction/Election for U.S. Appl. No. 16/886,040, filed May 28, 2020, dated Dec. 23, 2020, 6 pgs.
Sollie, Greg; Corrected Notice of Allowance for U.S. Appl. No. 16/401,607, filed May 2, 2019, dated Jan. 4, 2021, 9 pgs.
Sollie, Greg; Final Office Action for U.S. Appl. No. 16/280,595, filed Feb. 20, 2019, dated Dec. 30, 2020, 25 pgs.
Waltermire, Jamie; Certificate of Correction for U.S. Appl. No. 15/482,186, filed Apr. 7, 2017, dated Dec. 29, 2020, 1 pg.
Sollie, Greg; Applicant-Initiated Interview Summary for U.S. Appl. No. 16/530,052, filed Aug. 2, 2019, dated Feb. 5, 2020, 2 pgs.
Sollie, Greg; Final Office Action for U.S. Appl. No. 16/530,052, filed Aug. 2, 2019, dated Aug. 28, 2020, 29 pgs.
Sollie, Greg; Non-Final Office Action for U.S. Appl. No. 16/530,052, filed Aug. 2, 2019, dated Mar. 3, 2020, 24 pgs.
Sollie, Greg; Requirement for Restriction/Election for U.S. Appl. No. 16/401,603, filed May 2, 2019, dated Feb. 18, 2020, 6 pgs.
Sollie, Greg; Non-Final Office Action for U.S. Appl. No. 16/401,603, filed May 2, 2019, dated Mar. 10, 2020, 57 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; Notice of Allowance for U.S. Appl. No. 16/401,603, filed May 2, 2019, dated Aug. 31, 2020, 14 pgs.
Cellulose Material Solutions, LLC; Brochure for Infinity Care Thermal Liner, accessed on Oct. 22, 2018, 2 pgs.
Sollie, Greg; Corrected Notice of Allowance for U.S. Appl. No. 16/401,603, filed May 2, 2019, dated Nov. 3, 2020, 9 pgs.
Sollie, Greg; Non-Final Office Action for U.S. Appl. No. 16/401,607, filed May 2, 2019, dated Aug. 19, 2020, 88 pgs.
Uline; Article entitled: Corrugated Corner Protectors—4 × 4", accessed on Oct. 25, 2018, 1 pg.
Sollie, Greg; Notice of Allowance for U.S. Appl. No. 16/401,607, filed May 2, 2019, dated Dec. 4, 2020, 12 pgs.
Sollie, Greg; Requirement for Restriction/Election for U.S. Appl. No. 16/382,710, filed Apr. 12, 2019, dated Jul. 15, 2019, 6 pgs.
Sollie, Greg; Non-Final Office Action for U.S. Appl. No. 16/382,710, filed Apr. 12, 2019, dated Oct. 10, 2019, 49 pgs.
Sollie, Greg; Final Office Action for U.S. Appl. No. 16/382,710, filed Apr. 12, 2019, dated Apr. 6, 2020, 33 pgs.
Sollie, Greg; Notice of Allowance for U.S. Appl. No. 16/382,710, filed Apr. 12, 2019, dated Jun. 3, 2020, 12 pgs.
Sollie, Greg; Corrected Notice of Allowance for U.S. Appl. No. 16/382,710, filed Apr. 12, 2019, dated Sep. 24, 2020, 9 pgs.
DHL Express; Brochure for Dry Ice Shipping Guidelines, accessed on Oct. 26, 2018, 12 pgs.
Sollie, Greg; Notice of Allowance for U.S. Appl. No. 16/382,710, filed Apr. 12, 2019, dated Oct. 21, 2020, 5 pgs.
Sollie, Greg; Non-Final Office Action for U.S. Appl. No. 16/567,192, filed Sep. 11, 2019, dated Dec. 10, 2019, 49 pgs.
Sollie, Greg; Final Office Action for U.S. Appl. No. 16/567,192, filed Sep. 11, 2019, dated Jun. 8, 2020, 20 pgs.
Sollie, Greg; Notice of Allowance for U.S. Appl. No. 16/567,192, filed Sep. 11, 2019, dated Aug. 7, 2020, 14 pgs.
Sollie, Greg; Corrected Notice of Allowance for U.S. Appl. No. 16/567,192, filed Sep. 11, 2019, dated Oct. 20, 2020, 8 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Sollie, Greg; Non-Final Office Action for U.S. Appl. No. 16/408,981, filed May 10, 2019, dated Aug. 20, 2019, 50 pgs.
Sollie, Greg; Final Office Action for U.S. Appl. No. 16/408,981, filed May 10, 2019, dated Feb. 24, 2020, 29 pgs.
Sollie, Greg; Non-Final Office Action for U.S. Appl. No. 16/408,981, filed May 10, 2019, dated Sep. 16, 2020, 40 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65459, filed Dec. 13, 2018, dated May 1, 2019, 15 pgs.
Sollie, Greg; International Preliminary Reporton Patentability for PCT Application No. PCT/US18/65459, filed Dec. 13, 2018, dated Jul. 2, 2020, 11 pgs.

(56) References Cited

OTHER PUBLICATIONS

Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US18/65461, filed Dec. 13, 2018, dated Mar. 21, 2019, 13 pgs.
MP Global Products, LLC; First Examination Report for Australian patent application No. 2017359035, filed Nov. 7, 2017, dated Nov. 27, 2020, 3 pgs.
MP Global Products LLC: European Search Report Response for serial No. 17868605.1, filed Oct. 2, 2020, 15 pgs.
Sollie, Greg; International Search Report and Written Opinion for PCT/US18/65463, filed Dec. 13, 2018, dated Mar. 25, 2019, 11 pgs.
Sollie, Greg; International Preliminary Report on Patentability for PCT/US18/65463, filed Dec. 13, 2018, dated Dec. 3, 2020, 9 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US 19/59764, filed Nov. 5, 2019, dated Jan. 2, 2020, 2 pgs.
Sollie, Greg; International Search Report and Written Opinion for PCT Application No. PCT/US19/59764, filed Nov. 5, 2019, dated Jul. 1, 2020, 13 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Non-Final Office Action for U.S. Appl. No. 16/293,716, filed Mar. 6, 2019, dated Feb. 5, 2021, 18 pgs.
Waltermire, Jamie; Corrected Notice of Allowance for U.S. Appl. No. 16/561,203, filed Sep. 5, 2019, dated Feb. 5, 2021, 8 pgs.
Sollie, Greg; Corrected Notice of Allowance for U.S. Appl. No. 16/552,277, filed Aug. 27, 2019, dated Feb. 9, 2021, 9 pgs.
Sollie, Greg; Corrected Notice of Allowance for U.S. Appl. No. 15/845,540, filed Dec. 18, 2017, dated Feb. 12, 2021, 8 pgs.
Collison, Alan B.; Corrected Notice of Allowance for U.S. Appl. No. 16/658,756, filed Oct. 21, 2019, dated Jan. 28, 2021, 3 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
MP Global Products, LLC; Office Action for Chinese patent application No. 201780081689.7, dated Nov. 2, 2020, 17 pgs.
Collison, Alan B.; Non-Final Office Action for U.S. Appl. No. 17/123,676, filed Dec. 16, 2020, dated Feb. 3, 2021, 23 pgs.
Sollie, Greg; Certificate of Correction for U.S. Appl. No. 16/567,192, filed Sep. 11, 2019, dated Feb. 16, 2021, 1 pg.
MP Global Products LLC: European Office Action for application No. 17868605.1, dated Dec. 3, 2020, 4 pgs.
MP Global Products LLC: European Office Action Response for application No. 17868605.1, filed Jan. 19, 2021, 15 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
MP Global Products, LLC; International Search Report and Written Opinion of the International Searching Authority for PCT/US2017/060403, filed Nov. 7, 2017, dated Feb. 19, 2018, 15 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
Collison, Alan B.; Non-Final Office Action for U.S. Appl. No. 15/677,738, filed Aug. 15, 2017, dated Oct. 23, 2018, 11 pgs.
Collison, Alan B.; Applicant Interview Summary for U.S. Appl. No. 15/677,738, filed Aug. 15, 2017, dated Dec. 5, 2018, 4 pgs.
Collison, Alan B.; Final Office Action for U.S. Appl. No. 15/677,738, filed Aug. 15, 2017, dated Feb. 28, 2019, 14 pgs.
Collison, Alan B.; Applicant Interview Summary for U.S. Appl. No. 15/677,738, filed Aug. 15, 2017, dated Apr. 22, 2019, 4 pgs.
Voluntary Standard for Repulping and Recycling Corrugated Fiberboard Treated to Improve Its Performance in the Presence of Water and Water Vapor, (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf.
Collison, Alan B.; Non-Final Office Action for U.S. Appl. No. 16/658,756, filed Oct. 21, 2019, dated Feb. 4, 2020, 14 pgs.
MP Global Products LLC: European Search Report for serial No. 17868605.1, dated Mar. 16, 2020, 7 pgs.
Collison, Alan B.; Applicant Interview Summary for U.S. Appl. No. 16/658,756, filed Oct. 21, 2019, dated May 6, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Applicant Interview Summary for U.S. Appl. No. 16/658,756, filed Oct. 21, 2019, dated Jun. 29, 2020, 3 pgs.
Collison, Alan B.; Advisory Action for U.S. Appl. No. 16/658,756, filed Oct. 21, 2019, dated Sep. 25, 2020, 4 pgs.
Collison, Alan B.; Notice of Allowance for U.S. Appl. No. 16/658,756, filed Oct. 21, 2019, dated Oct. 23, 2020, 10 pgs.
Collison, Alan B.; Requirement for Restriction/Election for U.S. Appl. No. 16/414,309, filed May 16, 2019, dated Jun. 16, 2020, 5 pgs.
Collison, Alan B.; Non-Final Office Action for U.S. Appl. No. 16/414,309, filed May 16, 2019, dated Jul. 17, 2020, 77 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Patent Application No. 16/414/309, filed May 16, 2019, dated Oct. 15, 2020, 3 pgs.
Collison, Alan B.; Notice of Allowance for U.S. Appl. No. 16/414/309, filed May 16, 2019, dated Oct. 21, 2020, 6 pgs.
Collison, Alan B.; Corrected Notice of Allowance for U.S. Appl. No. 16/414,309, filed May 16, 2019, dated Nov. 16, 2020, 10 pgs.
Collison, Alan B.; Corrected Notice of Allowance for U.S. Appl. No. 16/414,309, filed May 16, 2019, dated Nov. 27, 2020, 9 pgs.
Collison, Alan B.; Non-Final Office Action for U.S. Appl. No. 16/414,310, filed May 16, 2019, dated Jul. 8, 2020, 84 pgs.
Collison, Alan B.; Applicant-Initiated Interview Summary for U.S. Appl. No. 16/414,310, filed May 16, 2019, dated Jul. 30, 2020, 3 pgs.
Collison, Alan; Final Office Action for U.S. Appl. No. 16/414,310, filed May 16, 2019, dated Oct. 13, 2020, 30 pgs.
Collison, Alan B.; Notice of Allowance for U.S. Appl. No. 16/414,310, filed May 16, 2019, dated Nov. 13, 2020, 15 pgs.
Collison, Alan B.; Supplemental Notice of Allowance for U.S. Appl. No. 16/414,310, filed May 16, 2019, dated Dec. 3, 2020, 8 pgs.
Sollie, Greg; Non-Final Office Action for U.S. Appl. No. 15/988,550, filed May 24, 2018, dated May 29, 2019, 48 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 15/988,550, filed May 24, 2018, dated Mar. 11, 2020, 35 pgs.
Sollie, Greg; Final Office Action for U.S. Appl. No. 15/988,550, filed May 24, 2018, dated Aug. 27, 2020, 27 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.

(56) References Cited

OTHER PUBLICATIONS

Sollie, Greg; Non-Final Office Action for U.S. Appl. No. 16/280,595, filed Feb. 20, 2019, dated May 29, 2019, 60 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/280,595, filed Feb. 20, 2019, dated Mar. 24, 2020, 20 pgs.
Sollie, Greg; Applicant-Initiated Interview Summary for U.S. Appl. No. 16/280,595, filed Feb. 20, 2019 dated May 6, 2020, 3 pgs.
Sollie, Greg; Advisory Action for U.S. Appl. No. 16/280,595, filed Feb. 20, 2019, dated Jul. 6, 2020, 3 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/280,595, filed Feb. 20, 2019, dated Aug. 28, 2020, 26 pgs.
Sollie, Greg; Non-Final Office Action for U.S. Appl. No. 16/530,052, filed Aug. 2, 2019, dated Oct. 2, 2019, 12 pgs.
Waltermire, Jamie; Corrected Notice of Allowance for U.S. Appl. No. 15/482,186, filed Apr. 7, 2017, dated Jun. 2, 2020, 10 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Notice of Allowance for U.S. Appl. No. 15/482,186, filed Apr. 7, 2017, dated Mar. 5, 2020, 29 pgs.
Waltermire, Jamie; Requirement for Restriction/Election for U.S. Appl. No. 15/482,186, filed Apr. 7, 2017, dated Apr. 17, 2019, 7 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Corrected Notice of Allowance for U.S. Appl. No. 16/526,511, filed Jul. 30, 2019, dated Oct. 30, 2020, 14 pgs.
Waltermire, Jamie; Corrected Notice of Allowance for U.S. Appl. No. 16/526,511, filed Jul. 30, 2019, dated Nov. 30, 2020, 9 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/526,511, filed Jul. 30, 2019, dated Jul. 10, 2020, 23 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Notice of Allowance for U.S. Appl. No. 15/482,200, filed Apr. 7, 2017, dated May 14, 2019, 25 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Non-Final Office Action for U.S. Appl. No. 16/530,045, filed Aug. 2, 2019, dated May 27, 2020, 38 pgs.
Waltermire, Jamie; Non-Final Office Action for U.S. Appl. No. 16/164,933, filed Oct. 19, 2018, dated Nov. 18, 2020, 104 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Final Office Action for U.S. Appl. No. 15/590,345, filed May 9, 2017, dated Mar. 19, 2019, 42 pgs.
Waltermire, Jamie; Non-Final Office Action for U.S. Appl. No. 15/590,345, filed May 9, 2017, dated Aug. 24, 2018, 41 pgs.
Waltermire, Jamie; Notice of Allowance for U.S. Appl. No. 15/590,345, filed May 9, 2017, dated Oct. 1, 2019, 28 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Corrected Notice of Allowance for U.S. Appl. No. 15/590,349, filed May 9, 2017, dated Nov. 2, 2020, 9 pgs.
Waltermire, Jamie; Final Office Action for U.S. Appl. No. 15/590,349, filed May 9, 2017, dated Jan. 6, 2020, 26 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/590,349, filed May 9, 2017, dated Nov. 5, 2018, 41 pgs.
Waltermire, Jamie; Non-Final Office Action for U.S. Appl. No. 15/590,349, filed May 9, 2017, dated Jun. 12, 2020, 30 pgs.
Waltermire, Jamie; Non-Final Office Action for U.S. Appl. No. 15/590,349, filed May 9, 2017, dated Sep. 5, 2019, 25 pgs.
Waltermire, Jamie; Notice of Allowance for U.S. Appl. No. 15/590,349, filed May 9, 2017, dated Oct. 20, 2020, 20 pgs.
Waltermire, Jamie; Requirement for Restriction/Election for U.S. Appl. No. 15/590,349, filed May 9, 2017, dated Aug. 30, 2018, 10 pgs.
Waltermire, Jamie; Final Office Action for U.S. Appl. No. 16/293,716, filed Mar. 6, 2019, dated Oct. 29, 2020, 19 pgs.
Waltermire, Jamie; Final Office Action for U.S. Appl. No. 16/293,716, filed Mar. 6, 2019, dated Sep. 10, 2020, 24 pgs.
Waltermire, Jamie; Non-Final Office Action for U.S. Appl. No. 16/293,716, filed Mar. 6, 2019, dated May 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Requirement for Restriction/Election for U.S. Appl. No. 16/526,555, filed Jul. 30, 2019, dated Jan. 17, 2020, 7 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Final Office Action for U.S. Appl. No. 15/663,905, filed Jul. 31, 2017, dated Aug. 22, 2019, 23 pgs.
Waltermire, Jamie; Supplemental Notice of Allowance for U.S. Appl. No. 16/164,933, filed Oct. 19, 2018, dated May 26, 2021, 10 pgs.
Waltermire, Jamie; Supplemental Notice of Allowance for U.S. Appl. No. 16/164,933, filed Oct. 19, 2018, dated Jun. 16, 2021, 7 pgs.
Waltermire, Jamie; Certificate of Correction for U.S. Appl. No. 15/590,349, filed May 9, 2017, dated Aug. 1, 2021, 1 pg.
Waltermire, Jamie; Non-Final Office Action for U.S. Appl. No. 16/293,716, filed Mar. 6, 2019, dated Jul. 26, 2021, 26 pgs.
Waltermire, Jamie; Notice of Allowance for U.S. Appl. No. 16/526,555, filed Jul. 30, 2019, dated May 21, 2021, 32 pgs.
Waltermire, Jamie; Supplemental Notice of Allowance for U.S. Appl. No. 16/526,555, filed Jul. 30, 2019, dated Jun. 8, 2021, 13 pgs.
Waltermire, Jamie; Supplemental Notice of Allowance for U.S. Appl. No. 16/526,555, filed Jul. 30, 2019, dated Jul. 6, 2021, 7 pgs.
Waltermire, Jamie; Notice of Allowance for U.S. Appl. No. 16/381,678, filed Apr. 11, 2019, dated Jun. 3, 2021, 14 pgs.
Waltermire, Jamie; Notice of Allowance for U.S. Appl. No. 16/689,407, filed Nov. 20, 2019, dated Jul. 19, 2021, 12 pgs.
Sollie, Greg; Certificate of Correction for U.S. Appl. No. 15/845,540, filed Dec. 18, 2017, dated Jun. 1, 2021, 1 pg.

(56) References Cited

OTHER PUBLICATIONS

Collison, Alan B.; Applicant-Initiated Interview Summary for U.S. Appl. No. 17/123,673, filed Dec. 16, 2020, dated Jun. 24, 2021, 2 pgs.
Collison, Alan B.; Notice of Allowance for U.S. Patent Applicaiton No. U.S. Appl. No. 17/123,673, filed Dec. 16, 2020, dated Jul. 1, 2021, 12 pgs.
Collison, Alan B.; Supplemental Notice of Allowance for U.S. Appl. No. 17/123,676, filed Dec. 16, 2020, dated Jun. 1, 2021, 10 pgs.
Collison, Alan B.; Supplemental Notice of Allowance for U.S. Appl. No. 17/123,676, filed Dec. 16, 2020, dated Jun. 24, 2021, 7 pgs.
Sollie, Greg; Corrected Notice of Allowance for U.S. Appl. No. 15/988,550, filed May 24, 2018, dated Jun. 11, 2021, 7 pgs.
Sollie, Greg; Advisory Action for U.S. Appl. No. 16/530,052, filed Aug. 2, 2019, dated Jun. 29, 2021, 15 pgs.
Sollie, Greg; Non-Final Office Action for U.S. Appl. No. 16/879,811, filed May 21, 2020, dated Jun. 22, 2021, 93 pgs.
Sollie, Greg; Notice of Allowance for U.S. Appl. No. 16/879,811, filed May 21, 2020, dated Jul. 7, 2021, 5 pgs.
Sollie, Greg; Corrected Notice of Allowance for U.S. Appl. No. 16/408,981, filed May 10, 2019, dated Jun. 16, 2021, 9 pgs.
Sollie, Greg; Notice of Allowance for U.S. Appl. No. 16/886,040, filed May 28, 2020, dated Jul. 7, 2021, 12 ogs.
Waltermire, Jamie; International Preliminary Report on Patentability for PCT Application No. PCT/US18/65464, filed Dec. 13, 2018, dated Jun. 24, 2021, 8 pgs.
Sollie, Greg; International Preliminary Report on Patentability for PCT Application No. PCT/US19/60486, filed Nov. 18, 2019, dated May 27, 2021, 9 pgs.
Sollie, Greg; International Preliminary Report on Patentability for PCT Application No. PCT/US19/59764, filed Nov. 5, 2019, dated May 27, 2021, 9 pgs.
Waltermire, Jamie; Final Office Action for U.S. Appl. No. 16/526,555, filed Jul. 30, 2019, dated Mar. 8, 2021, 25 pgs.
Waltermire, Jamie; Non-Final Office Action for U.S. Appl. No. 16/381,678, filed Apr. 11, 2019, dated Mar. 5, 2021, 36 pgs.
Waltermire, Jamie; Final Office Action for U.S. Appl. No. 16/689,407, filed Nov. 20, 2019, dated Apr. 23, 2021, 18 pgs.
Waltermire, Jamie; Non-Final Office Action for U.S. Appl. No. 16/689,433, filed Nov. 20, 2019, dated Feb. 23, 2021, 88 pgs.
Collison, Alan B.; Certificate of Correction for U.S. Patent Application No. 16/414,309, filed May 16, 2019, dated Mar. 9, 2021, 1 pg.
Collison, Alan B.; Non-Final Office Action for U.S. Appl. No. 17/123,673, filed Dec. 16, 2020, dated Mar. 23, 2021, 86 pgs.
Collison, Alan B.; Applicant-Initiated Interview Summary for U.S. Appl. No. 17/123,676, filed Dec. 16, 2020, dated May 4, 2021, 4 pgs.
Collison, Alan B.; Notice of Allowance for U.S. Appl. No. 17/123,676, filed Dec. 16, 2020, dated May 13, 2021, 93 pgs.
Sollie, Greg; Corrected Notice of Allowance for U.S. Appl. No. 15/988,550, filed May 24, 2018, dated May 10, 2021, 9 pgs.
Sollie, Greg; Notice of Allowance for U.S. Appl. No. 15/988,550, filed May 24, 2018, dated Apr. 13, 2021, 21 pgs.
Sollie, Greg; Non-Final Office Action for U.S. Appl. No. 16/280,595, filed Feb. 20, 2019, dated Apr. 9, 2021, 20 pgs.
Sollie, Greg; Final Office Action for U.S. Appl. No. 16/530,052, filed Aug. 2, 2019, dated Apr. 20, 2021, 27 pgs.
Sollie, Greg; Corrected Notice of Allowance for U.S. Appl. No. 16/401,607, filed May 2, 2019, dated Mar. 15, 2021, 13 pgs.
Sollie, Greg; Corrected Notice of Allowance for U.S. Appl. No. 16/401,607, filed May 2, 2019, dated Apr. 29, 2021, 8 pgs.
Sollie, Greg; Corrected Notice of Allowance for U.S. Appl. No. 16/408,981, filed May 10, 2019, dated Mar. 15, 2021, 9 pgs.
Sollie, Greg; Corrected Notice of Allowance for U.S. Appl. No. 16/408,981, filed May 10, 2019, dated Apr. 29, 2021, 6 pgs.
Sollie, Greg; Notice of Allowance for U.S. Appl. No. 16/408,981, filed May 10, 2019, dated Feb. 23, 2021, 6 pgs.
Sollie, Greg; Non-Final Office Action for U.S. Appl. No. 16/886,040, filed May 28, 2020, dated Mar. 30, 2021, 39 pgs.

MP Global Products LLC: European Office Action for application No. 17868605.1, dated Apr. 13, 2021, 3 pgs.
Collison, Alan. B.; Extended European Search Report for application No. 21160713.0, filed Nov. 7, 2017, dated May 10, 2021, 7 pgs.
Waltermire, Jamie; Notice of Allowance for U.S. Appl. No. 16/164,933, filed Oct. 19, 2018, dated May 14, 2021, 24 pgs.
Sollie, Greg; Requirement for Restriction/Election for U.S. Appl. No. 16/879,811, filed May 21, 2020, dated Apr. 15, 2021, 6 pgs.
Waltermire, Jamie; Notice of Allowance for U.S. Appl. No. 16/293,716, filed Mar. 6, 2019, dated Nov. 3, 2021, 20 pgs.
Waltermire, Jamie; Certificate of Correction for U.S. Appl. No. 16/526,555, filed Jul. 30, 2019, dated Nov. 16, 2021, 1 pg.
Waltermire, Jamie; Corrected Notice of Allowance for U.S. Appl. No. 16/689,433, filed Nov. 20, 2019, dated Nov. 12, 2021, 9 pgs.
Collison, Alan B.; Notice of Allowance for U.S. Appl. No. 17/181,377, filed Feb. 22, 2021, dated Oct. 21, 2021, 6 pgs.
Collison, Alan B.; Non-Final Office Action for U.S. Appl. No. 17/502,599, filed Oct. 15, 2021, dated Nov. 30, 2021, 6 pgs.
Sollie, Greg; Non-Final Office Action for U.S. Appl. No. 16/280,595, filed Feb. 20, 2019, dated Dec. 8, 2021, 17 pgs.
Sollie, Greg; Final Office Action for U.S. Appl. No. 16/530,052, filed Aug. 2, 2019, dated Dec. 8, 2021, 17 pgs.
Sollie, Greg; Notice of Allowance for U.S. Appl. No. 17/078,884, filed Oct. 23, 2020, dated Nov. 22, 2021, 12 pgs.
Sollie, Greg; Applicant-Initiated Interview Summary for U.S. Appl. No. 17/078,891, filed Oct. 23, 2020, dated Oct. 25, 2021, 2 pgs.
Sollie, Greg; Notice of Allowance for U.S. Appl. No. 17/078,891, filed Oct. 23, 2020, dated Dec. 1, 2021, 12 pgs.
Sollie, Greg; Notice of Allowance for U.S. Appl. No. 16/886,040, filed May 28, 2020, dated Nov. 18, 2021, 10 pgs.
Sollie, Greg; International Preliminary Reporton Patentability for PCT Application No. PCT/US20/24820, filed Mar. 26, 2020, dated Nov. 11, 2021, 13 pgs.
MP Global Products, LLC; Office Action for Canadian patent application No. 3,043,192, filed Nov. 7, 2017, dated Oct. 25, 2021, 11 pgs.
MP Global Products LLC; Office Action for Chinese Patent Application No. 201780081689.7, dated May 14, 2021, 17 pgs.
MP Global Products, LLC; Decision on Rejection for Chinese patent application No. 201780081689.7, dated Sep. 23, 2021, 15 pgs.
Waltermire, Jamie; Notice of Allowance for U.S. Appl. No. 16/164,933, filed Oct. 19, 2018, dated Aug. 9, 2021, 10 pgs.
Waltermire, Jamie; Requirement for Restriction/Election for U.S. Appl. No. 16/721,995, filed Dec. 20, 2019, dated Aug. 13, 2021, 6 pgs.
Waltermire, Jamie; Supplemental Notice of Allowance for U.S. Appl. No. 16/526,555, filed Jul. 30, 2019, dated Aug. 11, 2021, 8 pgs.
Waltermire, Jamie; Corrected Notice of Allowance for U.S. Appl. No. 16/381,678, filed Apr. 11, 2019, dated Aug. 9, 2021, 8 pgs.
Waltermire, Jamie; Examiner-Initiated Interview Summary for U.S. Appl. No. 16/381,678, filed Apr. 11, 2019, dated Aug. 30, 2021, 2 pgs.
Waltermire, Jamie; Corrected Notice of Allowance for U.S. Appl. No. 16/689,407, filed Nov. 20, 2019, dated Oct. 20, 2021, 8 pgs.
Waltermire, Jamie; Corrected Notice of Allowance for U.S. Appl. No. 16/689,407, filed Nov. 20, 2019, dated Aug. 20, 2021, 9 pgs.
Waltermire, Jamie; Final Office Action for U.S. Appl. No. 16/689,433, filed Nov. 20, 2019, dated Aug. 5, 2021, 23 pgs.
Waltermire, Jamie; Notice of Allowance for U.S. Appl. No. 16/689,433, filed Nov. 20, 2019, dated Oct. 15, 2021, 14 pgs.
Collison, Alan B.; Non-Final Office Action for U.S. Appl. No. 17/181,377, filed Feb. 22, 2021, dated Jul. 1, 2021, 22 pgs.
Collison, Alan B.; Restriction Requirement for U.S. Appl. No. 17/181,377, filed Feb. 22, 2021, dated Apr. 22, 2021, 6 pgs.
Colison, Alan B.; Corrected Notice of Allowance for U.S. Appl. No. 17/123,673, filed Dec. 16, 2020, dated Oct. 6, 2021, 8 pgs.
Collison, Alan B.; Corrected Notice of Allowance for U.S. Appl. No. 17/123,673, filed Dec. 16, 2020, dated Aug. 23, 2021, 9 pgs.
Collison, Alan B.; Supplemental Notice of Allowance for U.S. Appl. No. 17/123,676, filed Dec. 16, 2020, dated Sep. 13, 2021, 10 pgs.

(56) References Cited

OTHER PUBLICATIONS

Sollie, Greg; Final Office Action for U.S. Appl. No. 16/280,595, filed Feb. 20, 2019, dated Aug. 16, 2021, 21 pgs.
Sollie, Greg; Non-Final Office Action for U.S. Appl. No. 16/530,052, filed Aug. 2, 2019, dated Aug. 13, 2021, 22 pgs.
Sollie, Greg; Non-Final Office Action for U.S. Appl. No. 17/078,884, filed Oct. 23, 2020, dated Aug. 12, 2021, 105 pgs.
Sollie, Greg; Non-Final Office Action for U.S. Appl. No. 17/078,891, filed Oct. 23, 2020, dated Aug. 23, 2021, 104 pgs.
Sollie, Greg; Non-Final Office Action for U.S. Appl. No. 17/187,239, filed Feb. 26, 2021, dated Sep. 21, 2021, 99 pgs.
Sollie, Greg; Notice of Allowance for U.S. Appl. No. 17/187,239, filed Feb. 26, 2021, dated Oct. 13, 2021, 5 pgs.
Sollie, Greg; Corrected Notice of Allowance for U.S. Appl. No. 16/879,811, filed May 21, 2020, dated Oct. 6, 2021, 8 pgs.
Sollie, Greg; Non-Final Office Action for U.S. Appl. No. 17/185,616, filed Feb. 25, 2021, dated Sep. 15, 2021, 103 pgs.
Sollie, Greg; Corrected Notice of Allowance for U.S. Appl. No. 16/886,040, filed May 28, 2020, dated Oct. 7, 2021, 8 pgs.
Sollie, Greg; Corrected Notice of Allowance for U.S. Appl. No. 16/886,040, filed May 28, 2020, dated Aug. 20, 2021, 9 pgs.
Sollie, Greg; Non-Final Office Action for U.S. Appl. No. 17/100,819, filed Nov. 21, 2020, dated Sep. 29, 2021, 107 pgs.
US 11,247,836, 2/2022, (withdrawn)
Waltermire, Jamie; Non-Final Office Action for U.S. Appl. No. 16/530,045, filed Aug. 2, 2019, dated Feb. 10, 2022, 82 pgs.
Waltermire, Jamie; Non-Final Office Action for U.S. Appl. No. 16/721,995, filed Dec. 20, 2019, dated Dec. 27, 2021, 133 pgs.
Collison, Alan B.; Certificate of Correction for U.S. Appl. No. 17/123,676, filed Dec. 16, 2020, dated Jan. 4, 2021, 1 pg.
Sollie, Greg; Certificate of Correction for U.S. Appl. No. 16/879,811, filed May 21, 2020, dated Feb. 8, 2022, 1 pg.
Sollie, Greg; Final Office Action for U.S. Appl. No. 17/185,616, filed Feb. 25, 2021, dated Jan. 28, 2022, 37 pgs.
Waltermire, Jamie; Requirement for Restriction/Election for U.S. Appl. No. 17/127,050, filed Dec. 18, 2020, dated Apr. 14, 2022, 5 pgs.
Waltermire, Jamie; Requirement for Restriction/Election for U.S. Appl. No. 17/127,102, filed Dec. 18, 2020, dated Apr. 14, 2022, 6 pgs.
Sollie, Greg; Non-Final Office Action for U.S. Appl. No. 16/951,465, filed Nov. 18, 2020, dated May 13, 2022, 123 pgs.
Sollie, Greg; Final Office Action for U.S. Appl. No. 17/100,819, filed Nov. 21, 2020, dated Apr. 13, 2022, 39 pgs.
Collison, Alan B.; Certificate of Correction for U.S Patent Application No. 11,214,427, filed Dec. 16, 2020, dated Mar. 29, 2022, 1 pg.
Collison, Alan B.; Notice of Allowance for U.S. Appl. No. 17/502,599, filed Oct. 15, 2021, dated Mar. 9, 2022, 94 pgs.
Sollie, Greg; Advisory Action for U.S. Appl. No. 16/530,052, filed Aug. 2, 2019, dated Mar. 9, 2022, 4 pgs.
Sollie, Greg; Certificate of Correction for U.S. Appl. No. 17/187,239, filed Feb. 26, 2021, dated Apr. 26, 2022, 1 pg.
MP Global Products, LLC; Office Action for Canadian patent application No. 3,043,192, filed Nov. 7, 2017, dated Apr. 8, 2022, 9 pgs.
Sollie, Greg; Notice of Allowance for U.S. Design U.S. Appl. No. 29/745,881, filed Aug. 10, 2020, dated May 9, 2022, 139 pgs.
Any Custom Box. Perforated Dispenser Boxes. Publication date unavailable. Visited May 2, 2022. https://anycustombox.com/folding-cartons/perforated-dispenser-boxes, 9 pgs.
Massage Warehouse. Cando® Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Waltermire, Jamie; Final Office Action for U.S. Appl. No. 16/530,045, filed Aug. 2, 2019, dated Jun. 9, 2022, 20 pgs.
Waltermire, Jamie; Non-Final Office Action for U.S. Appl. No. 16/721,995, filed Dec. 20, 2019, dated Jul. 5, 2022, 28 pgs.
Waltermire, Jamie; Non-Final Office Action for U.S. Appl. No. 17/127,050, filed Dec. 18, 2020, dated Jun. 17, 2022, 147 pgs.
Waltermire, Jamie; Non-Final Office Action for U.S. Appl. No. 17/127,102, filed Dec. 18, 2020, dated Jun. 27, 2022, 128 pgs.
Sollie, Greg; Restriction Requirement for U.S. Appl. No. 16/951,454, filed Nov. 18, 2020, dated Jun. 14, 2022, 6 pgs.
Sollie, Greg; Final Office Action for U.S. Appl. No. 16/280,595, filed Feb. 20, 2019, dated May 31, 2022, 27 pgs.
Sollie, Greg; Non-Final Office Action for U.S. Appl. No. 17/492,285, filed Oct. 1, 2021, dated Jul. 11, 2022, 109 pgs.
Sollie, Greg; Notice of Allowance for U.S. Appl. No. 17/185,616, filed Feb. 25, 2021, dated Jun. 17, 2022, 18 pgs.
Sollie, Greg; Non-Final Office Action for U.S. Appl. No. 17/493, filed Oct. 4, 2021, dated Jul. 14, 2022, 110 pgs.
Sollie, Greg; Non-Final Office Action for U.S. Appl. No. 17/493,474, filed Oct. 4, 2021, dated Jul. 11, 2022, 112 pgs.
Collison, Alan B.; Office Action for Chinese patent application No. 2021107289972, filed Nov. 7, 2017, dated May 7, 2022, 20 pgs.
Waltermire, Jamie; Certificate of Correction for U.S. Appl. No. 16/293,716, filed Mar. 6, 2019, dated Aug. 12, 2022, 3 pgs.
Sollie, Greg; Non-Final Office Action for U.S. Appl. No. 16/951,454, filed Nov. 18, 2020, dated Aug. 4, 2022, 165 pgs.
Solie, Greg; Final Office Action for U.S. Appl. No. 16/951,465, filed Nov. 18, 2020, dated Aug. 18, 2022, 20 pgs.

\* cited by examiner

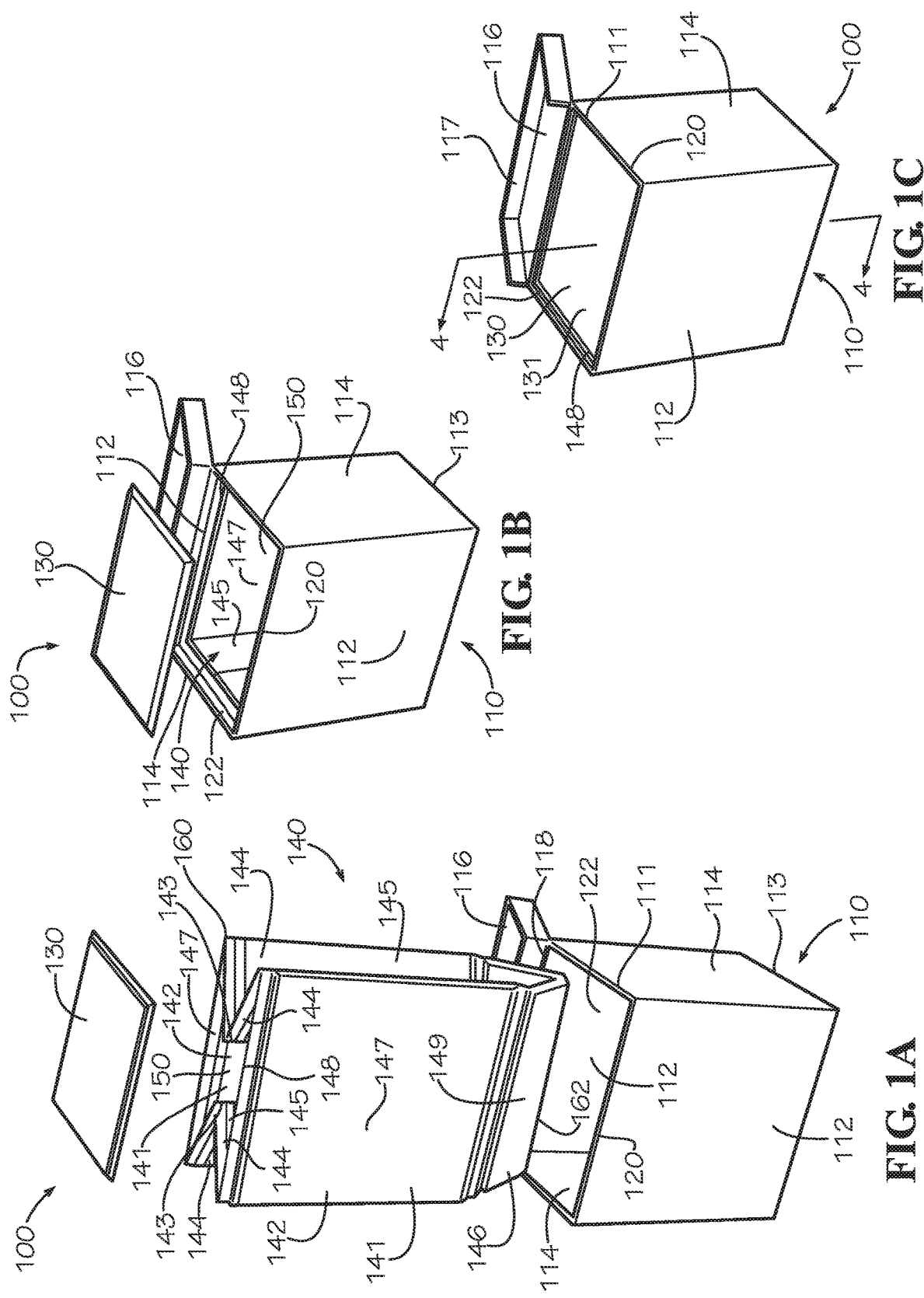

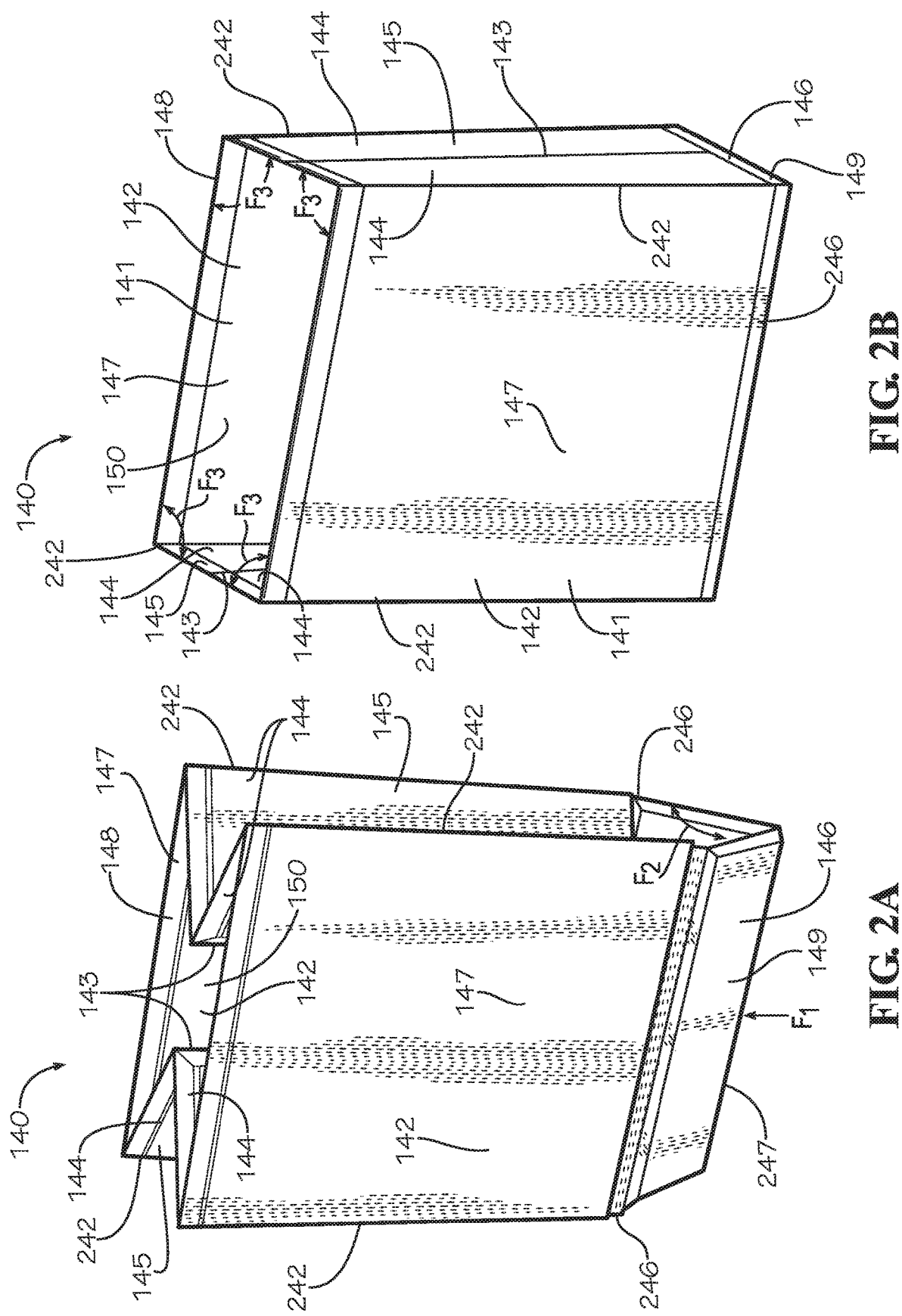

BOX LINER

CROSS-REFERENCE TO RELATED APPLICATIONS

This application is a continuation of U.S. application Ser. No. 16/526,511, filed Jul. 30, 2019, which is a divisional of U.S. application Ser. No. 15/482,186, filed Apr. 7, 2017, which issued into U.S. Pat. No. 10,800,595 on Oct. 13, 2020, each of which is hereby incorporated by reference herein in their entireties.

JOINT RESEARCH AGREEMENT

The subject matter disclosed herein was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to an insulated liner for box.

BACKGROUND

Packaging perishable or temperature sensitive contents for storage or shipping can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulated box assembly comprising a box comprising a pair of opposing side box panels, a pair of opposing main box panels, and a bottom box panel, the box defining an internal box cavity with a box opening defined opposite from the bottom box panel; and an insulated liner positioned within the internal box cavity, the insulated liner comprising a pair of opposing main liner panels and a pair of opposing side liner panels, the pair of opposing main liner panels and the pair of opposing side liner panels defined by a single blank liner panel comprising a blank sheet and an insulation batt, the insulation batt positioned between the blank sheet and the box.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

FIG. 1A is an exploded view of an insulated box assembly comprising a box, an insulated liner, and an insulated panel in accordance with one aspect of the disclosure.

FIG. 1B is a perspective view of the insulated box assembly of FIG. 1A.

FIG. 1C is a perspective view of the insulated box assembly of FIG. 1A.

FIG. 2A is a perspective view of the insulated liner of FIG. 1A in a collapsed insertion configuration.

FIG. 2B is a perspective view of the insulated liner of FIG. 1A in an expanded configuration.

DETAILED DESCRIPTION

Figure 3A:
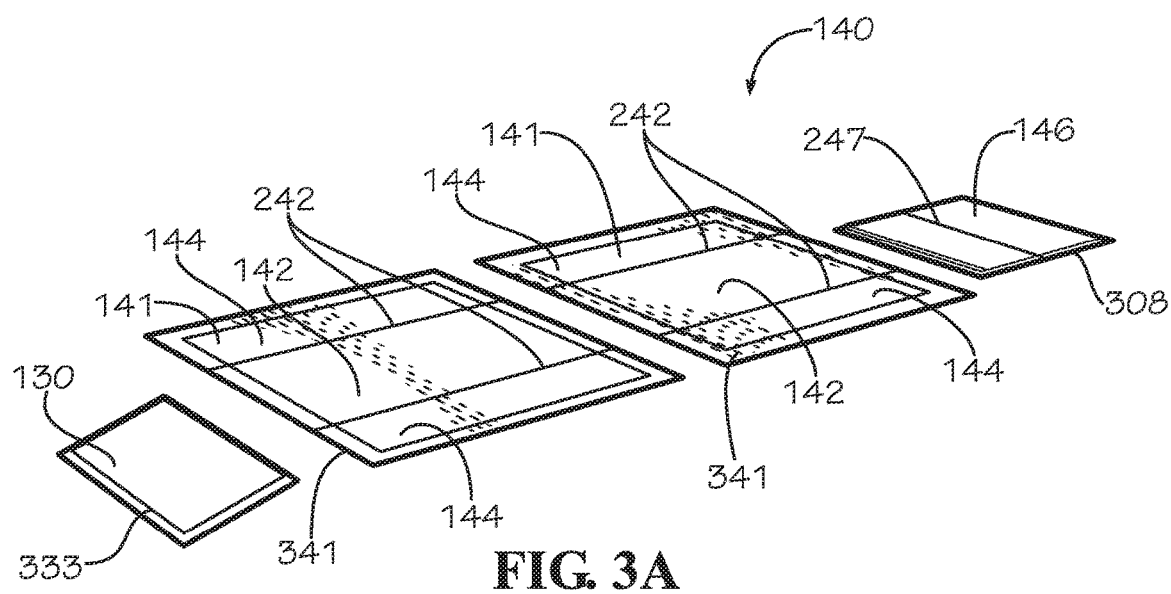
FIG. 3A is an exploded view of the insulated liner comprising two blank liner panels and a bottom panel and the insulated panel of FIG. 1A.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

In one aspect, disclosed is an insulated box assembly and associated methods, systems, devices, and various apparatus. The insulated box assembly can comprised a box, an insulated panel, and an insulated liner. It would be understood by one of skill in the art that the disclosed valve body is described in but a few exemplary aspects among many. No particular terminology or description should be considered limiting on the disclosure or the scope of any claims issuing therefrom.

FIGS. 1A-C disclose and describe an insulated box assembly 100 in one aspect of the present disclosure. FIG. 1A is an exploded view of an insulated box assembly 100 comprising a box 110, an insulated liner 140, and an insulated panel 130. In the present aspect, the box 110 can be a chute box; however, in other aspects, the box 110 can be any suitable type of box. The box 110 can comprise a pair of opposing main box panels 112, a pair of opposing side box panels 114, a box bottom panel 413 (shown in FIG. 4A), and a lid 116. The box 110 can define a top box end 111 and a bottom box end 113, and the top box end 111 can be disposed opposite from the bottom box end 113. The opposing main box panels 112, the opposing side box panels 114, and the box bottom panel 413 of the box 110 can define an internal box cavity 122, and the internal box cavity 122 can define a box opening 120 positioned at the top box end 111 of the box 110. The lid 116 can be attached to the box 110 at the top box end 111 by a lid hinge 118, and the lid 116 can be configured to selectively move about and between an open position and a closed position. In the closed position, the lid 116 can be configured to cover the box opening 120 and seal the internal box cavity 122. In the open position shown in FIGS. 1A-C, the lid 116 can be configured to uncover the box opening 120, and a user can add or withdraw contents from the internal box cavity 122. The internal box cavity 122 can be configured to receive the insulated liner 140 and the insulated panel 130.

The insulated liner 140 can be configured to line the internal box cavity 122. In the present aspect, the insulated liner 140 can comprise a liner bottom 149, an opposing pair of main liner panels 147, and an opposing pair of side liner panels 145. The liner bottom 149, the opposing pair of main liner panels 147, and the opposing pair of side liner panels 145 can define a liner cavity 150. The insulated liner 140 can comprise and be assembled from a bottom panel 146 and an opposing pair of blank liner panels 141. The blank liner panels 141 can be attached in an opposing configuration by a pair of side seams 143. Each blank liner panel 141 can define a main subpanel 142 positioned between a pair of side subpanels 144. In the opposing configuration, the blank liner panels 141 are aligned and facing each other such that the main subpanels 142 of the respective blank liner panels 141 can be aligned and each of the side subpanels 144 of a one of the blank liner panels 141 is aligned with a different one of the side subpanels 144 of another of the blank liner panels 141. Each of the main subpanels 142 of the blank liner panels 141 can define a one of the main liner panels 147 of the insulated liner 140. Each of the side seams 143 can attach together a one of the side subpanels 144 from each of the blank liner panels 141, thereby defining a one of the side liner panels 145.

Figure 6A:
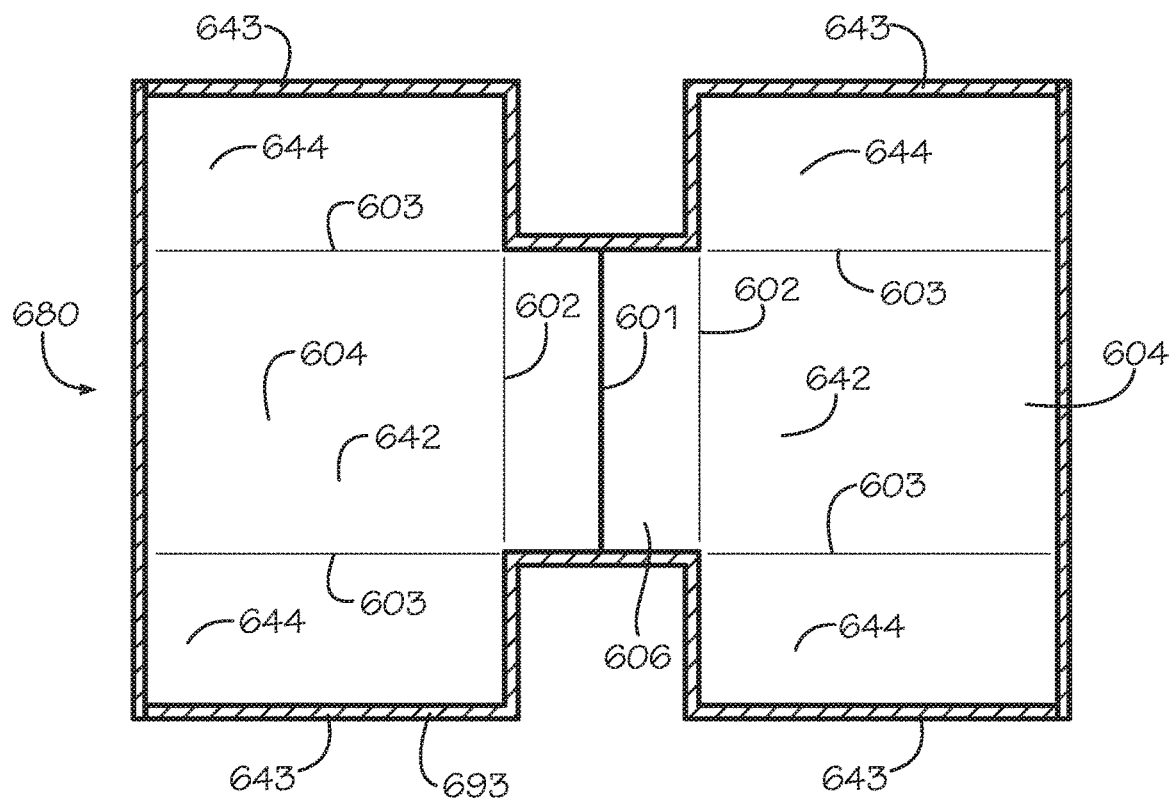
FIG. 6A is a top view of another aspect of a liner panel.
Figure 6B:
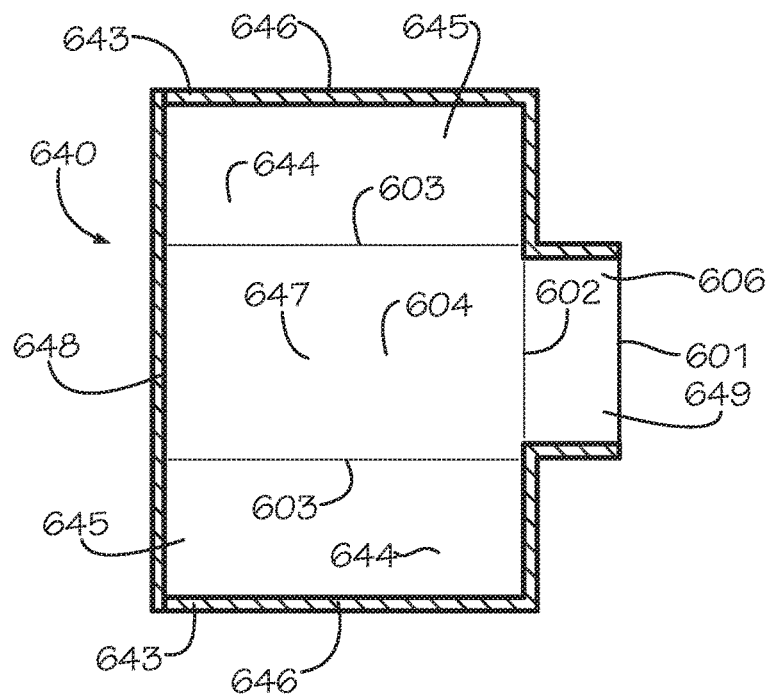
FIG. 6B is a top view of another aspect of an insulated liner.

The bottom panel 146 can be positioned at a bottom liner end 162 of the insulated liner 140. A liner opening 148 of the liner cavity 150 can be defined at a top liner end 160 opposite from the bottom liner end 162. The bottom panel 146 can define the liner bottom 149 of the insulated liner 140. In other aspects, the insulated liner 140 can be a one-piece insulated liner 640, as shown in FIG. 6B, which can comprise a one-piece blank liner panel 680, as shown in FIG. 6A. In such aspects, the liner bottom 149, the opposing pair of main liner panels 147, and the opposing pair of side liner panels 145 can be defined by the one-piece blank liner panel 680.

As shown in FIG. 1A, the insulated liner 140 can be collapsed into a collapsed insertion configuration in which the side liner panels 145 can be folded inwards towards the liner cavity 150, the main liner panels 147 can collapse inwards towards the liner cavity 150, and the liner bottom 149 of the insulated liner 140 can be in a folded position. In this configuration, the side liner panels 145 do not interfere with the opposing side box panels 114 of the box 110, and the collapsed main liner panels 147 provide a clearance between the insulated liner 140 and the opposing main box panels 112. The clearance can facilitate insertion of the insulated liner 140 into the box 110. In the collapsed insertion position, the insulated liner 140 can be inserted into the internal box cavity 122 through the box opening 120. Inserting the insulated liner 140 fully into the internal box cavity 122 can assist in expanding the insulated liner 140 into an expanded configuration. This effect is further described below with respect to FIG. 2A.

FIG. 1B is a perspective view of the insulated box assembly 100 of FIG. 1A. As shown, the insulated liner 140 can be configured to fit within the internal box cavity 122 of the box 110. In the expanded configuration, the insulated liner 140 can be sized and shaped complimentary to the internal box cavity 122. The insulated liner 140 can conform to a shape defined by the internal box cavity 122. The liner opening 148 can be positioned adjacent to the box opening 120. The liner opening 148 can define a substantially rectangular shape complimentary in a size and a shape to the box opening 120. In the present aspect, the main liner panels 147 can be in facing engagement with the main box panels 112, the side liner panels 145 can be in facing engagement with the side box panels 114, and the liner bottom 149 can be in facing engagement with the box bottom panel 413 (shown in FIG. 4A) of the box 110.

Figure 4A:
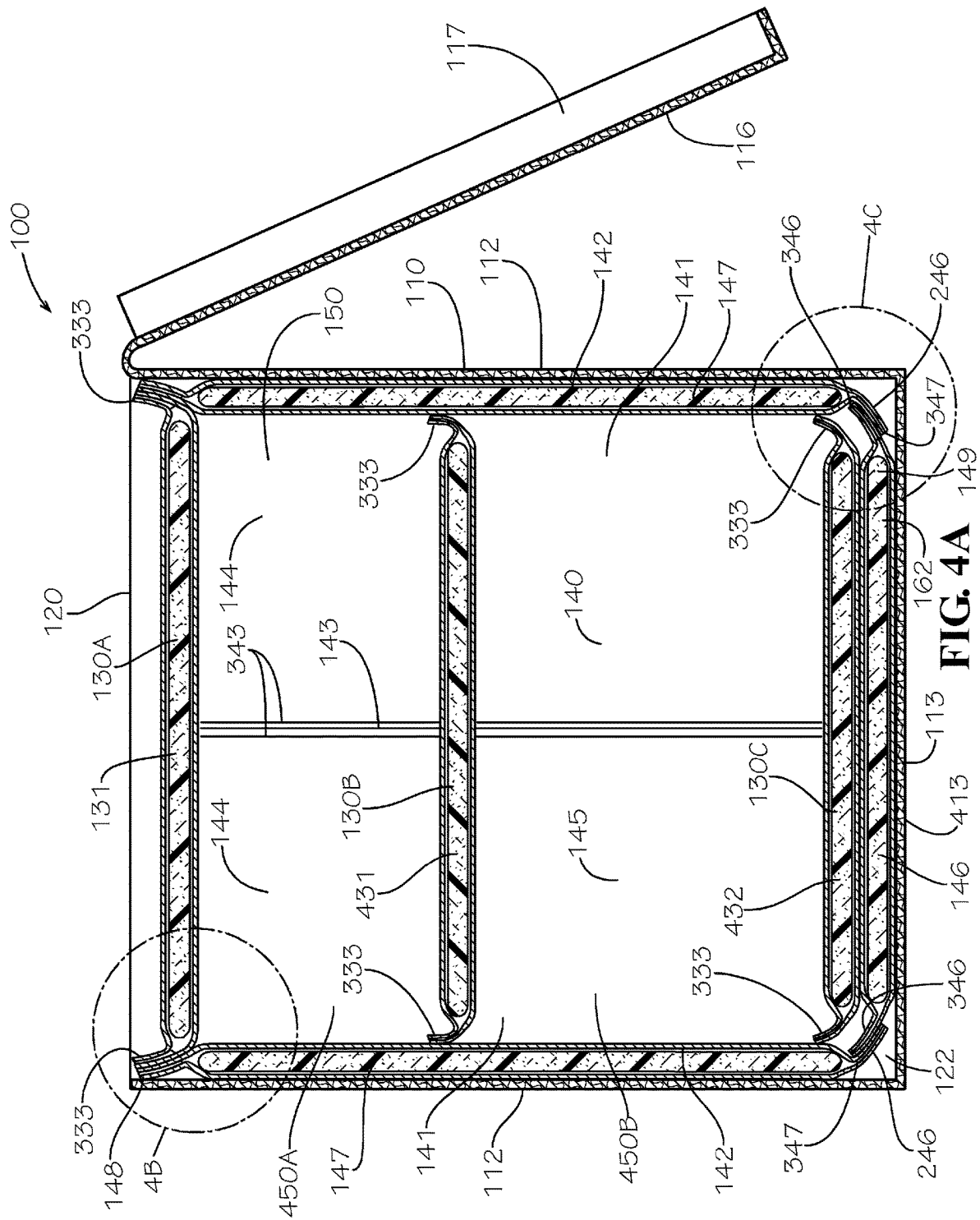
FIG. 4A is a cross-sectional view of the insulated box assembly of FIG. 1A taken along line 4-4 of FIG. 1C.

FIG. 1C is a perspective view of the insulated box assembly 100 of FIG. 1A. As shown, the insulated panel 130 can be a top panel 131 configured to cover the liner opening 148. The insulated panel 130 can comprise insulation, and a seal formed between the insulated panel 130 and the insulated liner 140 can increase an insulation value of the liner cavity 150 as shown in FIG. 4A. The lid 116 can be placed in the closed position (not shown) to enclose the insulated liner 140 and the insulated panel 130 within the internal box cavity 122. The lid 116 can comprise a lip 117 which can be shaped complimentary to the box opening 120. The lip 117 can form a box seal by overlapping a portion of the main box panel 112, and the side box panels 114 at the top box end 111 of the box 110.

FIG. 2A is a perspective view of the insulated liner 140 of FIG. 1A in the collapsed insertion configuration. When the side liner panels 145 are folded inwards towards the liner cavity 150, each pair of side subpanels 144 of the side liner panels 145 can fold relative to each other about the respective side seam 143. Each side subpanel 144 can fold relative to a one of the main subpanels 142 about a side crease line 242. Each of the side subpanels 144 can define an acute angle with an adjacent one of the main subpanels 142.

In the present aspect, the insulated panel 130, blank liner panel 141, and bottom panel 146 can each demonstrate a positional memory which biases the panel 130,141,146 towards a flat, substantially planar configuration. When the panels 130,141,146 are subjected to a bending moment or force, the panels 130,141,146 can elastically deform; however when the bending moment or force is removed, the panels 130,141,146 can return to the substantially planar configuration. When the panels 130,141,146 are elastically deformed, internal stresses can produce a force which resists the deflection. As the degree of deflection increases, the internal stresses can increase, and the resisting force can increase as well. When the panels 130,141,146 are returned to the substantially planar configuration, the force can be minimized or eliminated. The force can be maximized when the panels 130,141,146 are folded in half.

When the main liner panels 147 are collapsed inwards towards the liner cavity 150, the liner bottom 149 folds about a bottom crease line 247. The bottom crease line 247 can substantially bisect the liner bottom 149. The liner bottom 149 can fold downwards away from the side liner panels 145 exposing openings between the liner bottom 149 and the side liner panels 145. The liner bottom 149 can demonstrate the positional memory which can exert a force $F_2$ biasing the liner bottom 149 towards the expanded configuration from the collapsed insertion configuration. The force $F_2$ can resist folding of the liner bottom 149 about the bottom crease line 247. In the present aspect, the force $F_2$ can be exerted by the bottom panel 146 of the liner bottom 149; however in other aspects in which the liner bottom 149 is defined by a blank liner panel, the force $F_2$ can be exerted by the blank liner panel. Once in the expanded configuration, a value of the force $F_2$ is minimized.

In the present aspect, the bottom panel 146 can be attached to the main subpanels 142 by a pair of bottoms seams 246. In the present aspect, the bottom seams 246 can be flexible and do not demonstrate positional memory or a biasing force; however, in other aspects, the bottom seams 246 can be crease lines defined by a blank liner panel which can demonstrate positional memory and a biasing force.

The force $F_2$ can cooperate with a force $F_1$ to expand the insulated liner 140 from the collapsed insertion configuration to the expanded configuration. When the insulated liner 140 is inserted into the box 110, interference between the box bottom panel 413 (shown in FIG. 4A) of the box 110 and the liner bottom 149 of the insulated liner 140 can urge the liner bottom 149 to unfold. As shown, the force $F_1$ can act on the liner bottom 149 proximate the bottom crease line 247. The force $F_1$ can produce a moment about the bottom seams 246 which can bias the liner bottom 149 to unfold and flatten into a substantially planar configuration. The flattening of the liner bottom 149 can expand the opposing main liner panels 147 away from the liner cavity 150.

FIG. 2B is a perspective view of the insulated liner 140 of FIG. 1A in the expanded configuration. In the expanded configuration, a one of the main liner panels 147 can be parallel to another of the main liner panels 147, and a one of the side liner panels 145 can be parallel to another of the side liner panels 145. The liner bottom 149 can be substantially perpendicular to each of the main liner panels 147 and each of the side liner panels 145. The side liner panels 145, and the liner bottom 149 can be unfolded and substantially planar. The liner bottom 149 can be in non-sealing, connectionless contact with each of the side liner panels 145. The main liner panels 147 can be expanded away from the liner cavity 150.

In the present aspect, the blank liner panels 141 can also demonstrate the positional memory and exert a force $F_3$ biasing the side subpanels 144 to rotate about the side crease lines 242 away from the main subpanels 142 and towards the expanded configuration. In the expanded configuration, each of the side subpanels 144 can define a substantially right angle with the adjacent one of the main subpanels 142. If the insulated liner 140 is not restrained by the box 110, the side subpanels 144 can be biased to further unfold away from the main subpanels 142 to a collapsed storage position shown in FIG. 3C. In the present aspect, the side seams 143 can be flexible and do not demonstrate positional memory or a biasing force; however, in other aspects, the side seams 143 can be crease lines which can demonstrate positional memory and a biasing force.

The forces $F_1, F_2, F_3$ can cooperate to produce a self-expanding effect biasing the insulated liner 140 from the collapsed insertion configuration to the expanded configuration. The insulated liner 140 can be configured to self-expand from the collapsed insertion configuration to the expanded configuration when the insulated liner 140 is inserted or dropped into the internal box cavity 122 of the box 110. The self-expanding effect can be desirable in order to reduce or eliminate manual manipulation of the insulated liner 140 when inserting the insulated liner 140 into the box 110, such as in a manufacturing operation. The self-expanding effect can reduce the time required to assemble each insulated box assembly 100 or can facilitate automated assembly of the insulated box assemblies 100 such as by robotic or mechanized equipment.

Figure 3B:
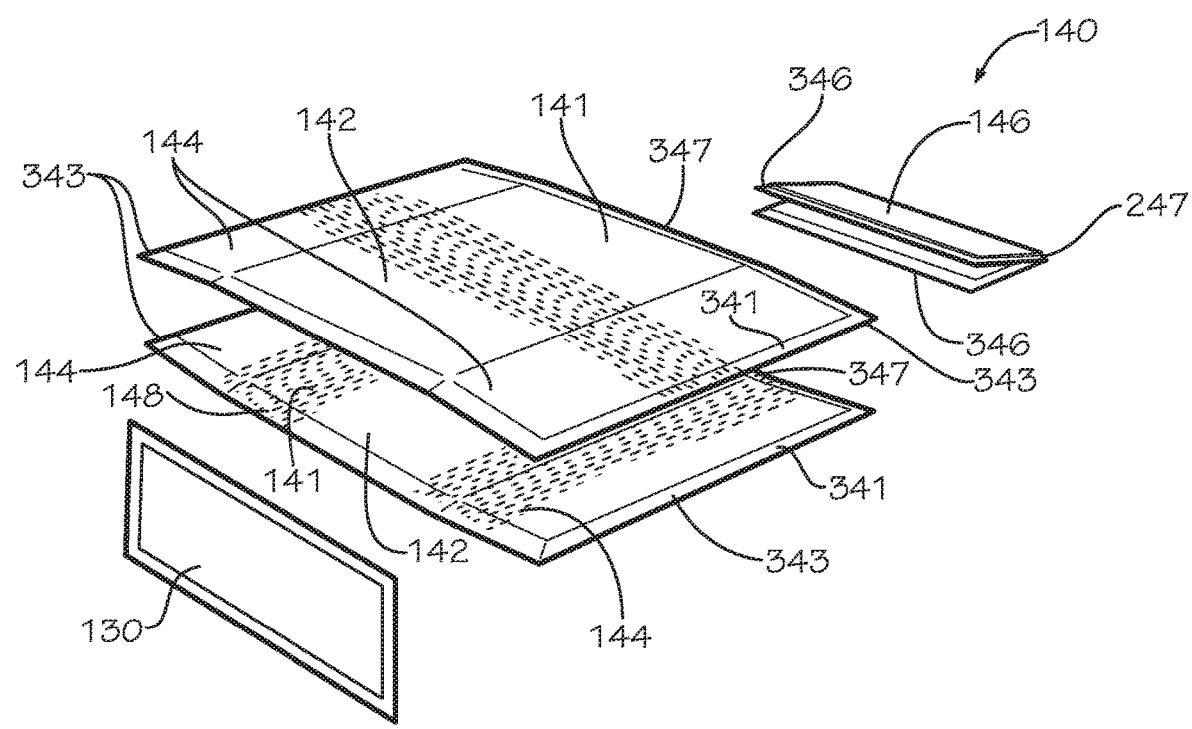
FIG. 3B is an exploded view of the insulated liner and the insulated panel of FIG. 1A in an aligned configuration.
Figure 3C:
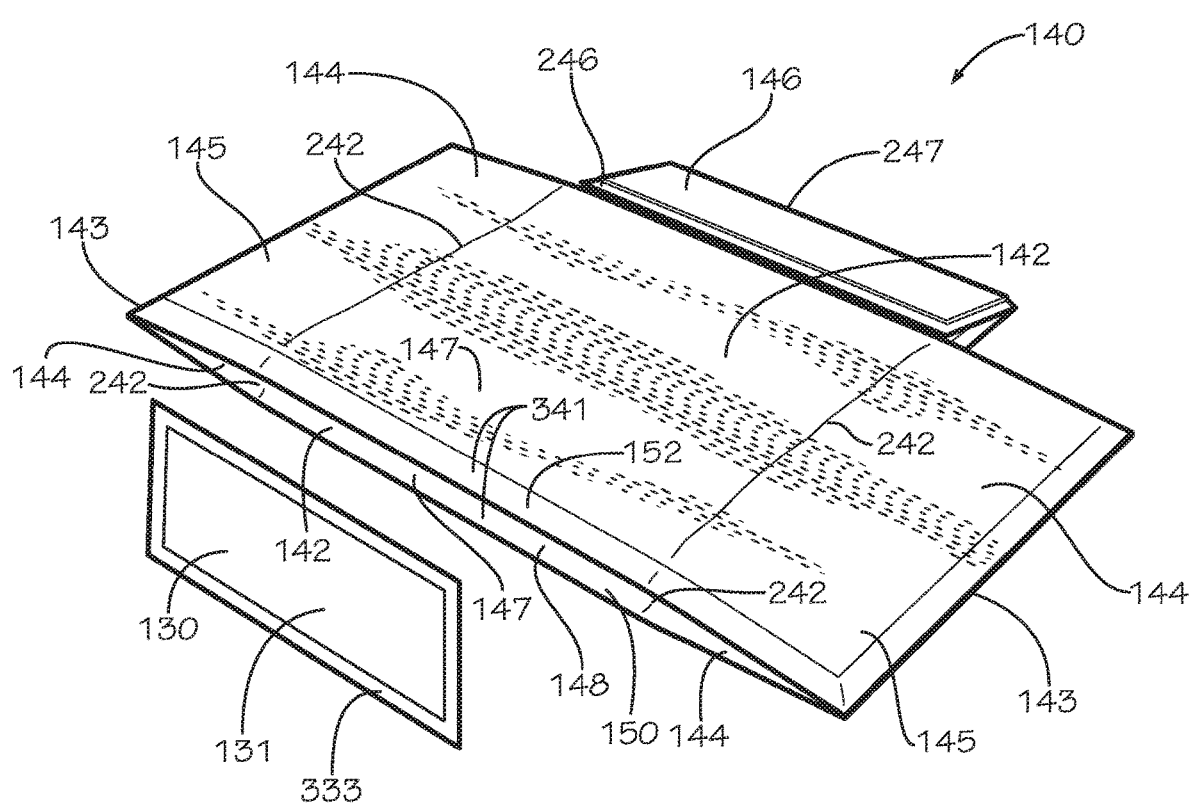
FIG. 3C is a perspective view of the insulated liner and the insulated panel of FIG. 1A in an assembled configuration.

FIGS. 3A-C show a perspective view of the assembly of the insulated liner 140. FIG. 3A is an exploded view of the insulated liner 140 comprising two blank liner panels 141 and a bottom panel 146 and the insulated panel 130 of FIG. 1A. In the present aspect, panels 130,141,146 can each define a border which can each be a two-ply seam. The blank liner panels 141 can each define a liner border 341 extending around a perimeter of the respective blank liner panel 141. The bottom panel 146 can define a bottom border 308 extending around a perimeter of the bottom panel 146. The insulated panel 130 can define a panel border 333 extending around a perimeter of the insulated panel 130. The liner border 341 can extend from the liner opening 148 to the bottom panel 146.

FIG. 3B is an exploded view of the insulated liner 140 and the insulated panel 130 of FIG. 1A in an aligned configuration. The two blank liner panels 141 are shown aligned in an opposing configuration, and the bottom panel 146 is folded about the bottom crease line 247 and aligned with each of the main subpanels 142 of the pair of blank liner panels 141. At opposing ends of each blank liner panel 141, a portion of each liner border 341 adjacent to a one of the side subpanels 144 can define a side border portion 343. The side border portions 343 of a one of the blank liner panels 141 can be aligned and adjacent to the side border portions 343 of a second of the blank liner panels 141.

Similarly, at opposing ends of the bottom panel 146 distal from the bottom crease line 247, the bottom border 308 can define a pair of first bottom border portions 346. A portion of each liner border 341 adjacent to the main subpanel 142 and distal from the liner opening 148 can define a second bottom border portion 347. Each of the first bottom border portions 346 of the bottom panel 146 can be aligned with a different one of the second bottom border portions of the pair of blank liner panels 141. In the position shown, the panels 141,146 are prepared to be attached to form the seams 143,246. The aligned side border portions 343 of the opposing blank liner panels 141 can be attached in facing engagement to form the side seams 143. Each of the sides seams 143 can be formed as a plain seam; however in other aspects, each of the side seams 143 can be a lap seam or any other type of seam. Each of the bottom seams 246 can be formed by attaching a one of the first bottom border portions 346 to a one of the second bottom border portions 347 in facing engagement. Each of the bottom seams 246 can be formed as a lap seam; however in other aspects, each of the bottom seams 246 can be a plain seam or any other type of seam. In other aspects, each of the bottom seams 246 can be formed by attaching a one of the first bottom border portions 346 directly to a one of the main subpanels 142 rather than to a portion of the liner border 341.

FIG. 3C is a perspective view of the assembled insulated liner 140 and the insulated panel 130 of FIG. 1A in an assembled configuration. In the present aspect, the bottoms seams 246 and the side seams 143 can be flexible and function as living hinges. Each of the side seams 143 can extend from the liner opening 148 to the bottom border portion 347. The border portions 343,346,347 can be attached in facing engagement using a glue, adhesive, tape, cement, or any other method of attachment such as stitching or stapling.

In the embodiment shown in FIG. 3C, the insulated panel 130 can be the top panel 131. In the present aspect, the top panel 131 can be separate and disconnected from the insulated liner 140. In other aspects, the top panel 131 can be attached to the insulated liner 140 by a top seam (not shown) formed by attaching a portion of the panel border 333 to a portion of the liner border 341 proximate the liner opening 148. The top seam (not shown) can also function as a living hinge allowing the top panel 131 to rotate about the top seam relative to the insulated liner 140.

FIG. 3C depicts the insulated liner 140 in the collapsed storage configuration. In the collapsed storage configuration, the side liner panels 145 extend outwards and away from the liner cavity 150, and the main liner panels 147 are collapsed together in facing engagement. Each of the side subpanels 144 can define an obtuse angle with an adjacent one of the main subpanels 142. In this configuration, the force $F_3$ exerted about the side crease lines 242 by the positional memory of the blank liner panels 141 is minimized. Conversely, when the insulated liner 140 is in the collapsed insertion configuration shown in FIGS. 1A and 2A, the force $F_3$ is maximized as each of the blank liner panels 141 can be nearly folded in half about each of the side crease lines 242. The collapsed storage configuration can be used for stacking, storing, or packaging the insulated liners 140 in bulk.

FIG. 4A is a cross-sectional view of the insulated box assembly 100 of FIG. 1A viewed from line 4-4 of FIG. 1C. In the aspect shown, the insulated box assembly 100 can optionally comprise three insulated panels 130A,B,C. In other aspects, the insulated box assembly 100 can comprise greater or fewer than three insulated panels 130. In the present aspects, the insulated panels 130B and 130C can be sized smaller than the insulated panel 130A in order to facilitate insertion into the liner cavity 150. In other aspects, the insulated panels 130A,B,C can all be sized and shaped similarly. The insulated panel 130A can be the top panel 131 positioned over the liner opening 148.

The insulated panel 130B can be a divider panel 431 which can partition the liner cavity 150 into a first insulated compartment 450A and a second insulated compartment 450B. This configuration can be desirable in order to maintain the first insulated compartment 450A and the second insulated compartment 450B at separate temperatures. In other aspects, the insulated box assembly 100 can comprise a plurality of divider panels 431 which can divide the liner cavity 150 into more than two insulated compartments 450. In the present aspect, the divider panel 431 can be in a horizontal orientation configured to partition the liner cavity 150 top-to-bottom. In other aspects, the divider panel 431 can be in a vertical orientation configured to partition the liner cavity 150 side-to-side, front-to-back, or diagonally. In some aspects, the insulated box assembly 100 can comprise a plurality of divider panels 431 in both horizontal orientations and vertical orientations. In the present aspect, the panel border 333 of the divider panel 431 can form a seal with the main liner panels 147 and the side liner panels 145 of the insulated liner 140. In some aspects, the divider panel 431 can rest upon contents of the second insulated compartment 450B.

Insulated panel 130C can be a floor panel 432 positioned on top of the bottom panel 146. In some embodiments, the bottom panel 146 may not comprise insulation (not shown), and the floor panel 432 can be placed atop the bottom panel 146 of the liner bottom 149 to insulate the bottom liner end 162. Such a configuration can be desirable in order to simplify manufacturing or reduce manufacturing steps. In the aspect shown, the bottom panel 146 comprises insulation, and the floor panel 432 can be positioned on top of the bottom panel 146 to provide increased insulation to the bottom liner end 162. This configuration can be desirable when the contents of the liner cavity 150 are heavy and can compress the insulation at the bottom liner end 162, thereby possibly rendering the insulation less effective. This configuration can also be desirable to provide increased insulation against conduction of heat through the bottom liner end 162 of the insulated liner 140 when the insulated box assembly 100 is resting upon a hot or cold environmental surface. As shown, each of the panels 130,141,146 can each be insulated.

Figure 4B:
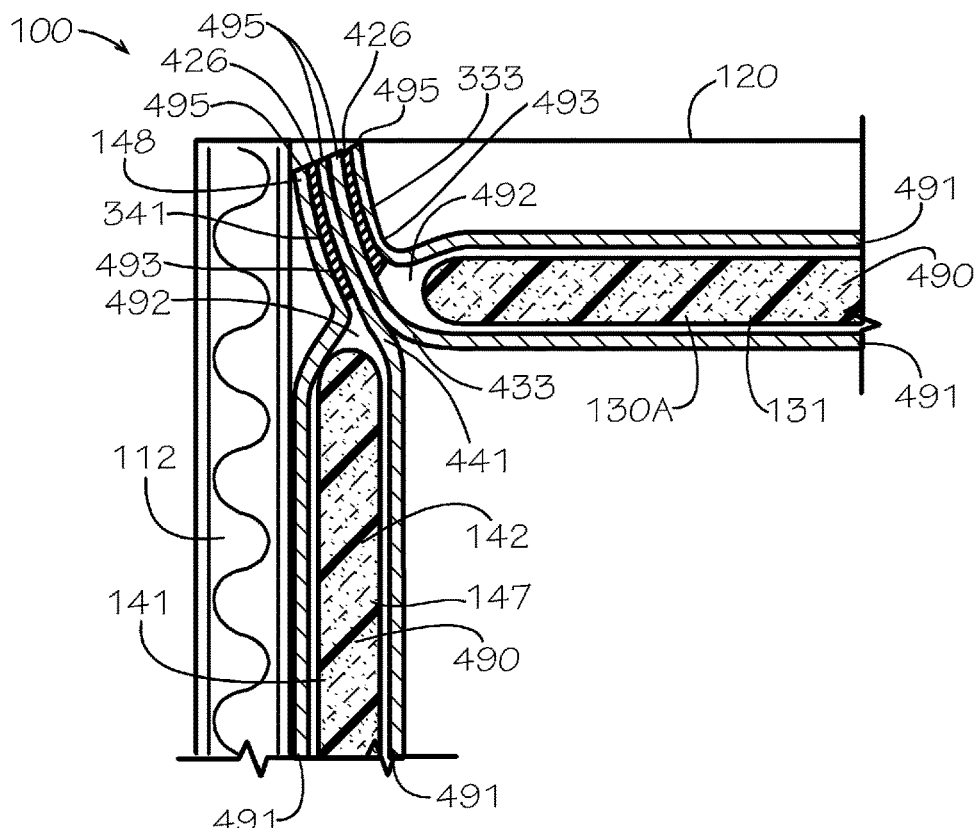
FIG. 4B is a detail view of the insulated box assembly taken from Detail 4B of FIG. 4A.
Figure 4C:
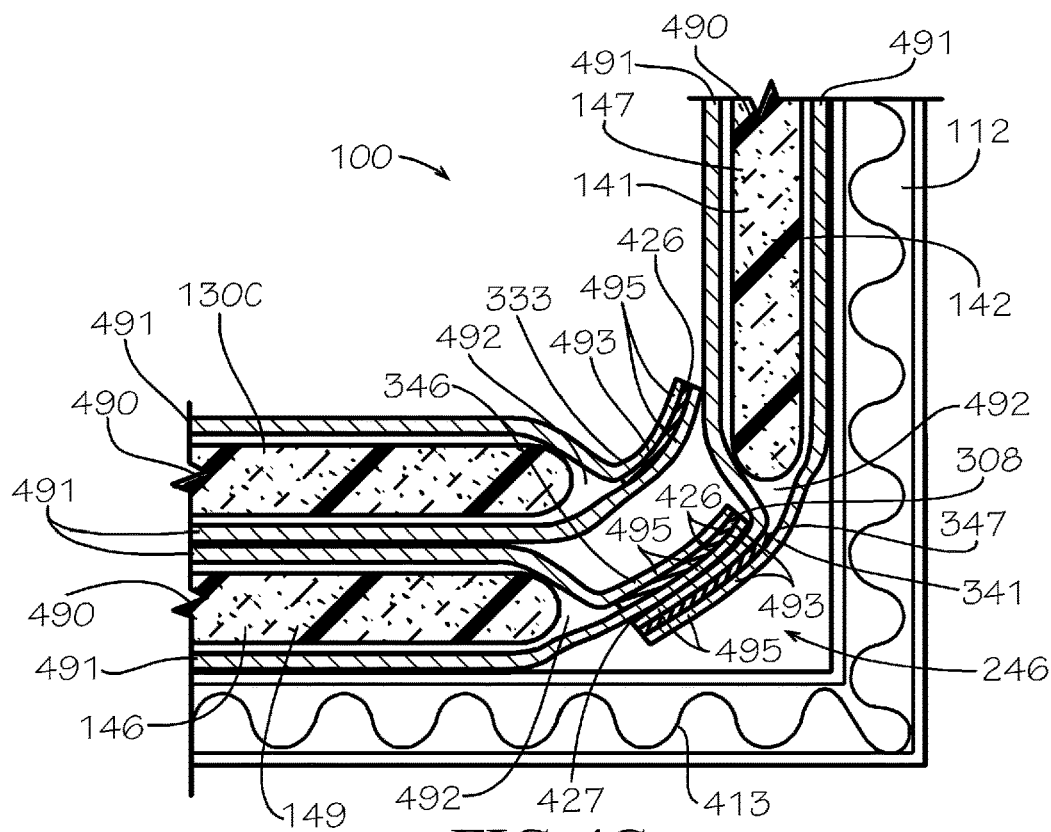
FIG. 4C is a detail view of the insulated box assembly taken from Detail 4C of FIG. 4A.

FIG. 4B is a detail view of the insulated box assembly 100 taken from detail 4B of FIG. 4A. As shown in FIGS. 4B and 4C and described in further detail with regard to FIG. 5, the panels 130,141,146 can each comprise an insulation batt 490 encapsulated between a pair of blank sheets 491. The insulation batt 490 can be positioned in a panel cavity 492 defined between the blank sheets 491. The panel cavity 492 can be enclosed by a border 493, which can be the panel border 333, the liner border 341, or the bottom border 308. The border 493 can be formed by attaching together in facing engagement a perimeter portion 495 of each of the blank sheets 491. In the present aspect, the perimeter portions 495 of the blank sheets 491 can be attached together by a first adhesive 426 which can be a glue, cohesive, cement, epoxy, or tape strip. In other aspects, the blank sheets 491 can be attached by another suitable method such as stitching or stapling.

FIG. 4B shows the construction of the top panel 131 and the blank liner panel 141. The top panel 131 can taper towards the panel border 333 which can define a beveled panel edge 433. Similarly, the blank liner panel 141 can taper towards the liner border 341 which can define a beveled liner edge 441 proximate the liner opening 148. When the top panel 131 is positioned to cover the liner opening 148, the panel border 333 and the beveled panel edge 433 can cooperate with the liner border 341 and the beveled liner edge 441 to form a seal between the top panel 131 and the insulated liner 140. The seal can improve an insulation value of the liner cavity 150.

FIG. 4C is a detail view of the insulated box assembly 100 taken from detail 4C of FIG. 4A. FIG. 4C shows a one of the bottom seams 246 formed between the bottom panel 146 and the blank liner panel 141. In the present aspect, each of the bottom seams 246 can be formed by attaching a one of the first bottom border portions 346 of the bottom panel 146 to a one of the second bottom border portions 347 of the blank liner panels 141, as described relative to FIG. 3C, which can define a four-ply seam comprised of four overlapping perimeter portions 495. Each of the side seams 143 can be a similarly constructed four-ply seam. The first bottom border portion 346 can be attached to the second bottom border portion 347 in facing engagement with a second adhesive 427. The second adhesive 427 can be the same as the first adhesive 426, or in other aspects, the second adhesive 427 can be a different type of adhesive such as a glue, cement, epoxy, or tape strip. As shown, the panel border 333 of insulated panel 130C can cooperate with the insulated liner 140 to form a seal within the liner cavity 150.

Figure 5:
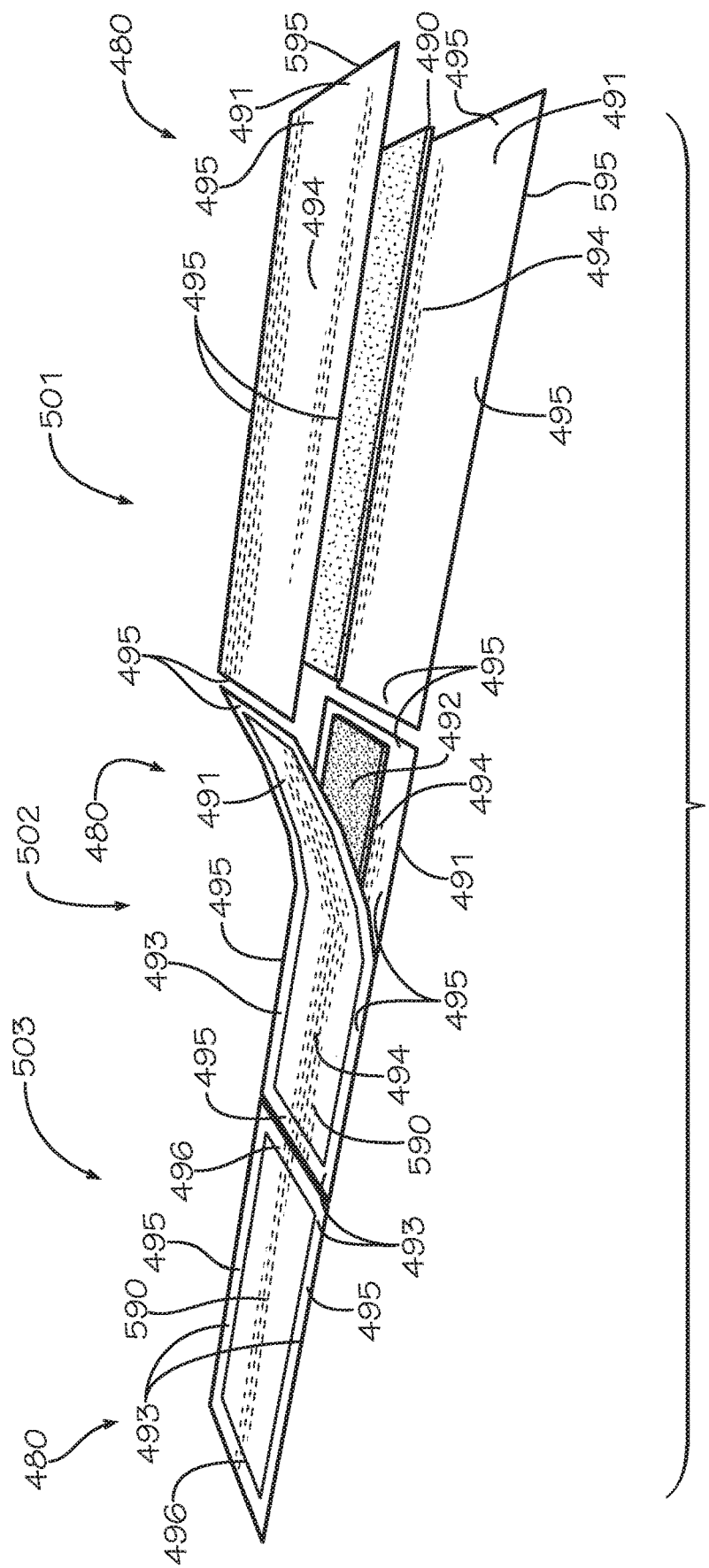
FIG. 5 is a perspective view of a method of manufacturing for an insulated panel.

FIG. 5 is a perspective view of a method of manufacturing for an insulated panel 480. The insulated panel 480 can be representative of the insulated panels 130, the blank liner panels 141, the bottom panel 146, or the blank liner panel 680 (shown in FIG. 6).

In a step 501, an insulation batt 490 can be positioned between a pair of blank sheets 491. The blank sheets 491 can be sized and shaped complimentary to each other; however in some aspects, the blank sheets 491 can differ in size and shape. Each sheet can define an outer edge 595 and a perimeter portion 495 proximate the outer edge 595. The perimeter portions 495 can extend around the outer edge 595 of each of the respective blank sheets 491. The insulation batt 490, blank sheets 491, and the insulated panel 480 can each be substantially flat and planar prior to assembly.

The blank sheets 491 can be sized to overhang the insulation batt 490 on all sides with the perimeter portions 495 extending beyond the insulation batt 490. The perimeter portions 495 can each encompass an interior portion 494 of a different one of the blank sheets 491. The interior portions 494 can be sized and shaped complimentary to the insulation batt 490.

Surfaces of the blank sheets 491 facing the insulation batt 490 can be treated with an adhesive, such as the first adhesive 426. In the present aspect, only the perimeter portions 495 of the blank sheets 491 can be selectively treated with the first adhesive. In some aspects, the first adhesive 426 can be a cohesive which is configured to selectively adhere only to other cohesive treated areas. In some aspects, the insulation batt 490 can also be adhered to the interior portions 494 of the blank sheets 491.

In a step 502, the blank sheets 491 can be aligned and positioned in facing engagement wherein the perimeter portions 495 can be attached by the first adhesive 426 (not shown). The insulation batt 490 can be aligned between the interior portions 494. Attaching the perimeter portions 495 can form the border 493 of the insulated panel 480. The border 493 can be a two-ply seam formed by two overlapping perimeter portions 495. The border 493 can seal and enclose the insulation batt 490 within the panel cavity 492, defined between the interior portions 494 of the blank sheets 491. Portions of the insulated panel 480 containing the insulation batt 490 can define insulated portions 590. In some aspects, the insulation batt 490 can be aligned off-center from the blank sheets 491 wherein the border 493 can extend outwards from the insulated portions 590 further in some areas than others.

In a step 503, the perimeter portions 495 can be fully attached, thereby forming the completed border 493. A taper from the insulated portion 590 to the border 493 can define a beveled edge 496 which can be similar to the beveled panel edge 433 of the insulated panel 130 and the beveled liner edge 441 of the blank liner panel 141. The border 493 can extend outwards from the insulated portion 590.

In other aspects, the insulated panel 480 may not comprise the border 493 fully encompassing the insulated panel 480. In some aspects, some portions of the perimeter may expose an unfinished edge in which the insulation batt 490 is exposed. In some aspects, the insulated panel 480 may not define the border 493 on any portion of the perimeter of the insulated panel 480, and the entire perimeter can define an unfinished edge. In such aspects, the insulated panel 480 can comprise pre-laminated paper and each of the blank sheets 491 can be attached in facing contact with the insulation batt 490 with, for example and without limitation, an adhesive. In some aspects in which the insulated panel 480 defines the border 493, the insulation batt 490 can also be attached in facing contact with one or both of the blank sheets 491. In some aspects, the pre-laminated paper can be provided in a roll, and the insulated panels 480 can be cut to size from the roll.

In different aspects, the insulation batt 490 can define different thickness from less than 1/16" to over 2"; however, this range should not be viewed as limiting. In various aspects, the different panels 130,141,146 can each comprise insulation batts 490 of either different thicknesses or the same thickness. For example and without limitation, the bottom panel 146 can comprise an insulation batt 490 defining a thickness greater than that of an insulation batt 490 comprised by the blank liner panel 141. In other aspects, each insulation batt 490 can vary in thickness and define contours between areas of greater thickness and areas of lesser thickness.

Figure 7:
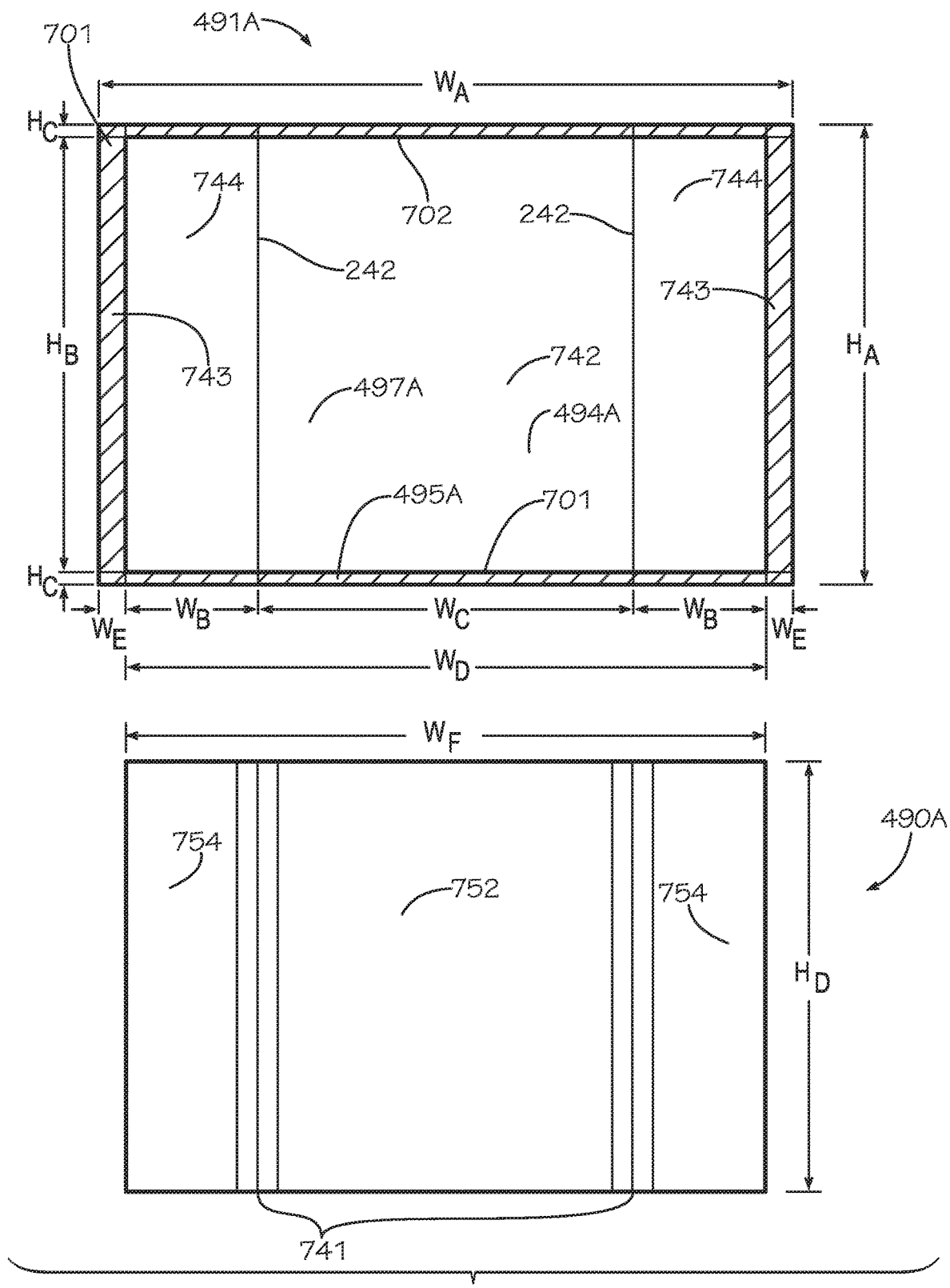
FIG. 7 is a top view of an aspect of a blank sheet and an aspect of an insulation batt for the liner panel of FIG. 3A.
Figure 8:
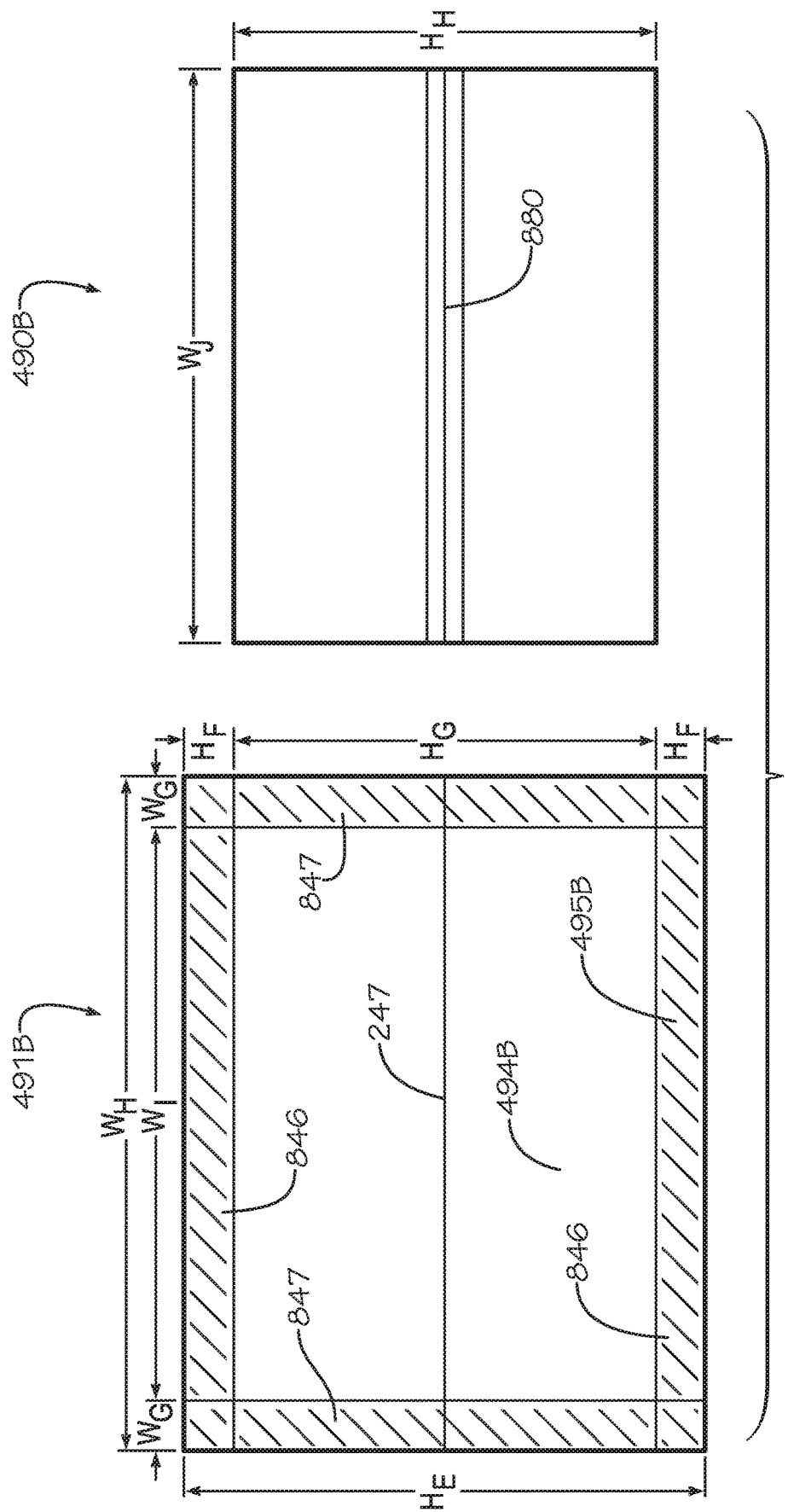
FIG. 8 is a top view of another aspect of the blank sheet and another aspect of the insulation batt for the bottom panel of FIG. 3A.

In some aspects, the thickness defined by the insulation batt 490 can affect a strength of the force exerted by the positional memory, such as forces $F_2$ and $F_3$, and increasing the thickness of the insulation batt 490 can increase the force exerted by the positional memory. Conversely, decreasing the thickness of the insulation batt 490 can decrease the force exerted by the positional memory of the insulation batt 490. One method of reducing the thickness of the insulation batt 490 can be to define a groove 741,880 into the insulation batt 490 as shown in FIG. 7 and FIG. 8. In the present aspect, each groove can be a V-shaped groove defined into the insulation batt 490 to facilitate folding of the insulation batt 490 about the groove. In other aspects, the grooves can define a different shape, such as semicircular. In some aspects, the groove can be aligned with a crease line of the panel 130,141,146, such as crease lines 242,247, in order to allow the panel 130,141,146 to bend more easily about the respective crease lines 242,247. Grooves can be desirable, for instance, for insulation batts 490 defining large thickness values which can be difficult to bend. Cutting grooves can also be desirable to concurrently optimize both the manufacturing process and the assembly process in which it can be desirable to use a single section of insulation batt 490 that does not exhibit positional memory at specific locations.

Additionally, a density defined by each of the insulation batts 490 can be varied in different aspects or between different insulation batts 490 comprised by a single insulated liner 140. In some aspects, increasing the density of the insulation batt 490 can increase an insulation value of the insulation batt 490. Increasing the density of the insulation batt 490 can also increase resistance to compression of the insulation batt 490. Compression of the insulation batt 490 can be undesirable as compression can degrade the insulation value of the insulation batt 490.

In some aspects, a plurality of insulation batts 490 can be encapsulated between the pair of blank sheets 491. In these aspects, the plurality of insulation batts 490 can overlap one another or alternatively, can be positioned separate from one another. Separated insulation batts 490 can be encapsulated in separate, isolated panel cavities 492 divided by a portion of the border 493 extending across the insulated panel 480 (not shown). Separately encapsulating the plurality of insulation batts 490 into a single insulated panel 480 can be an alternative to attaching together separate insulated panels 480 with seams or other attachment methods. In some aspects, the insulated panels 480 can define shapes other than rectangular. The insulation batt 490 and the blank sheets 491 can be cut or shaped, such as by die cutting, in order to define different shapes for the insulated panels 480.

FIG. 6A is a top view of another aspect of the blank liner panel 680. The blank liner panel 680 can be a one-piece blank liner panel 680 configured to form the one-piece insulated liner 640 of FIG. 6B without additional panels 130,146,141,480. The blank liner panel 680 can be manufactured through the method shown in FIG. 5, and the blank liner panel 680 can be constructed similar to the insulated panel 480. In the present aspect, the blank liner panel 680 can comprise a single, continuous insulation batt 490; however, in other aspects, the blank liner panel 680 can comprise a plurality of insulation batts 490. The blank liner panel 680 can define a pair of liner subpanels 604 connected by a bottom subpanel 606. The blank liner panel 680 can define a border 693 extending around a perimeter of the blank liner panel 680. Each liner subpanel 604 can define a pair of side border portions 643 of the border 693 positioned at opposite ends of the respective liner subpanel 604. The blank liner panel 680 can be folded in half about a bottom crease line 601 to bring the liner subpanels 604 into facing engagement and to align the respective side border portions 643 of each of the liner subpanels 604 with one another. The bottom crease line 601 can correspond to and function similarly to the bottom crease line 247 of the insulated liner 140.

The blank liner panel 680 can define a pair of liner crease lines 602, each positioned at an intersection between a one of the liner subpanels 604 and the bottom subpanel 606. The liner subpanels 604 can fold relative to the adjacent bottom subpanel 606 about the liner crease lines 602. The liner subpanels 604 can each define a pair of side crease lines 603. Each liner subpanel 604 can define a main subpanel 642 positioned between a pair of side subpanels 644. For each liner subpanel 604, the side crease lines 603 can extend between the main subpanel 642 and a different one of the side subpanels 644. Each of the side subpanels 644 can fold about a one of the side crease lines 603 relative to the adjacent main subpanel 642. In the present embodiment, the side crease lines 603 can be structurally and functionally similar to the side crease lines 242. In some aspects, the insulation batt 490 underlying each liner crease line 602 can be cut to define a groove which can facilitate bending of the blank liner panel 680 about any of the crease lines 601,602, 603.

FIG. 6B is a top view of another aspect of the insulated liner 640. The insulated liner 640 can be formed by folding the blank liner panel 680 in half about the bottom crease line 601 and attaching each pair of aligned side border portions 643 in facing engagement in order to form a pair of side seams 646. At each side seam 646, a pair of side subpanels 644, each defined by a different opposing liner subpanel 604, can be attached by the respective side seam 646. Similar to the insulated liner 140, the insulated liner 640 can comprise a liner bottom 649, an opposing pair of main liner panels 647, and an opposing pair of side liner panels 645. Each of the main liner panels 647 can be defined by a one of the main subpanels 642 of the liner subpanel 604 extending between the side crease lines 603. Each of the side liner panels 645 can be defined by a one of the pairs of side subpanels 644 attached by a one of the side seams 646. The liner bottom 649 can be defined by the bottom subpanel 606 extending between the liner crease lines 602. The main liner panels 647 and the side liner panels 645 can define a liner opening 648 defined distal from the bottom crease line 601.

FIG. 7 is a top view of another aspect of a blank sheet 491A and another aspect of an insulation batt 490A for the blank liner panels 141 of FIG. 3A. Each of the blank liner panels 141 can be formed by encapsulating the insulation batt 490A between two blank sheets 491A. The blank sheet 491A can define a height $H_A$ and a width $W_A$. The blank sheet 491A can define the interior portion 494A and the perimeter portion 495A which can surround the interior portion 494A. The interior portion 494A can define a height $H_B$ and a width $W_D$. The perimeter portion 495A can define a top portion 702 and a bottom portion 701 opposite from the top portion 702. Attaching two bottom portions 701 of two blank sheets 491A together can form the second bottom border portion 347. The perimeter portion 495A can also define a pair of side portions 743 opposite from one another. Attaching two side portions 743 of two blank sheets 491A together can form the side border portion 343. The top portion 702 and the bottom portion 701 can each define a height $H_C$, and the side portions 743 can each define a width $W_E$. In the aspect shown, the width $W_E$ can define a value greater than a value of height $H_C$. In some aspects, the side portions 743 may extend further outwards than the top portion 702 or the bottom portion 701. This configuration can be desirable to provide increased surface area for attaching the side border portions 343 of two separate blank liner panels 141 to form one of the side seams 143. In some aspects in which the second bottom border portion 347 is configured to attach to one of the first bottom border portions 346, the bottom portion 701 may extend further than the top portion 702.

The blank sheet 491A can define the side crease lines 242. The side crease lines 242 can divide the interior portion 494A into a main subpanel portion 742 and a pair of side subpanel portions 744. The main subpanel portion 742 can correspond to the main subpanel 142 of the blank liner panel 141, and the side subpanel portions 744 can correspond to the side subpanels 144 of the blank liner panel 141. The main subpanel portion 742 can define a width $W_C$, and the side subpanel portions 744 can each define a width $W_B$.

In some aspects, the insulation batt 490A can optionally define a pair of side grooves 741 which can be positioned to align with the side crease lines 242 when the insulation batt 490A is aligned with the interior portion 494A. However, in other aspects, the insulation batt 490A may not define the side grooves 741. The side grooves 741 can be defined into the insulation batt 490A, such as by die cutting the side grooves 741 into the insulation batt 490A. In the present aspect, the side grooves 741 can be V-shaped. The side grooves 741 can be configured to increase flexibility of the insulation batt 490A which can be desirable, particularly in aspects in which the insulation batt 490A is relatively thick, for example and without limitation when the insulation batt 490A is greater than ½" in thickness. The insulation batt 490A can range in thickness from less than ¹⁄₁₆" to over 2". In some aspects, the preferred thickness range can be from less than 1" to over 1.5". The side grooves 741 can define a main insulation portion 752 and two side insulation portions 754 which can be sized and shaped substantially similar to the main subpanel portions 742 and the side subpanel portions 744, respectively. The side grooves 741 can be defined on either one or both sides of the insulation batt 490A. In some aspects, the side grooves 741 can extend completely through the insulation batt 490A dividing the insulation batt 490A into separate subpanels.

The insulation batt 490A can define a width $W_F$ and a height $H_D$ which can each define a value substantially the same or slightly less, for example and without limitation 1" less, than the width $W_D$ and height $H_B$, respectively. This sizing allows the insulation batt 490A to fit within the panel cavity (not shown) defined between the interior portions 494A of two blank sheets 491A when the perimeter portions 495A are attached in facing engagement. Sizing the insulation batt 490A slightly smaller than the interior portion 494A can provide clearance for the thickness of the insulation batt 490A, particularly in embodiments in which the insulation batt 490A defines a large thickness such as ½" or greater.

FIG. 8 is a top view of another aspect of a blank sheet 491B and another aspect of an insulation batt 490B for the bottom panel 146 of FIG. 3A. In this aspect, the blank sheet 491B can define a width $W_H$ and a height $H_E$. In the present aspect, the width $W_H$ of the blank sheet 491B, which can correspond to a width of the bottom panel 146, can have substantially the same value as the width $W_C$ of the main subpanel portion 742, which can correspond to a width of the main subpanel 142 of the liner panel 141. The blank sheet 491B can define the interior portion 494B and the perimeter portion 495B which can extend around a perimeter of the blank sheet 491B. The bottom border 308 of the bottom panel 146 can be formed by attaching two perimeter portions 495B of two separate blank sheets 491B together in facing engagement.

The interior portion 494B can define a width $W_I$ and a height $H_G$. In some aspects in which the side seam 143 is a lap seam, the height $H_G$ can have substantially the same value as the combination of the width $W_E$ of the side portion 743 and the widths $W_B$ of the two side subpanel portions 744. The combination of width $W_E$ of the side portion 743 and the widths $W_B$ of the two side subpanel portions 744 can be approximately equal to a combined width of a one of the side seams 143 and a pair of side subpanels 144 which can together define a one of the side liner panels 145. In other aspects in which the side seam 143 is a plain seam, the height $H_G$ can have substantially the same value as twice the widths $W_B$ of the two side subpanel portions 744. With two blank sheets 491B aligned and attached in facing engagement, the interior portions 494B can define the panel cavity (not shown) which can contain the insulation batt 490B.

The blank sheet 491B can define the bottom crease line 247 which can bisect the blank sheet 491B. The perimeter portion 495B can define a pair of first bottom border portions 846 which can correspond to the first bottom border portions 346 of the bottom panel 146. Portions of the perimeter portion 495B at opposite ends of the bottom crease line 247 can define a pair of side border portions 847. The side border portions 847 can each define a width $W_G$ and the first bottom border portions 846 can each define a height $H_F$. In the present aspect, the width $W_G$ and the height $H_F$ can define values which can be substantially the same; however, in other aspects the height $H_F$ can define a value greater than the value of the width $W_G$. This configuration can be desirable to provide additional surface area for attaching the first bottom border portions 346 to the second bottom border portions 347 or to the main subpanels 142.

The insulation batt 490B can define a width $W_J$ and a height $H_H$ which can each define a value substantially the same or slightly less, for example and without limitation 1" less, than the width $W_I$ and height $H_G$, respectively. Similar to FIG. 7, this sizing allows the insulation batt 490B to fit within the panel cavity (not shown) defined between two blank sheets 491B. Sizing the insulation batt 490B slightly smaller than the interior portion 494B can provide clearance for the thickness of the insulation batt 490B, particularly in embodiments in which the insulation batt 490B defines a large thickness such as ½" or greater.

In some aspects, the insulation batt 490B can optionally define a bottom groove 880 which can be similar in shape, form, and function to the side grooves 741. The bottom groove 880 can be positioned to align with the bottom crease line 247 when the insulation batt 490B is aligned on top of the interior portion 494B. However, in other aspects, the insulation batt 490B may not define the bottom groove 880.

Figure 9:
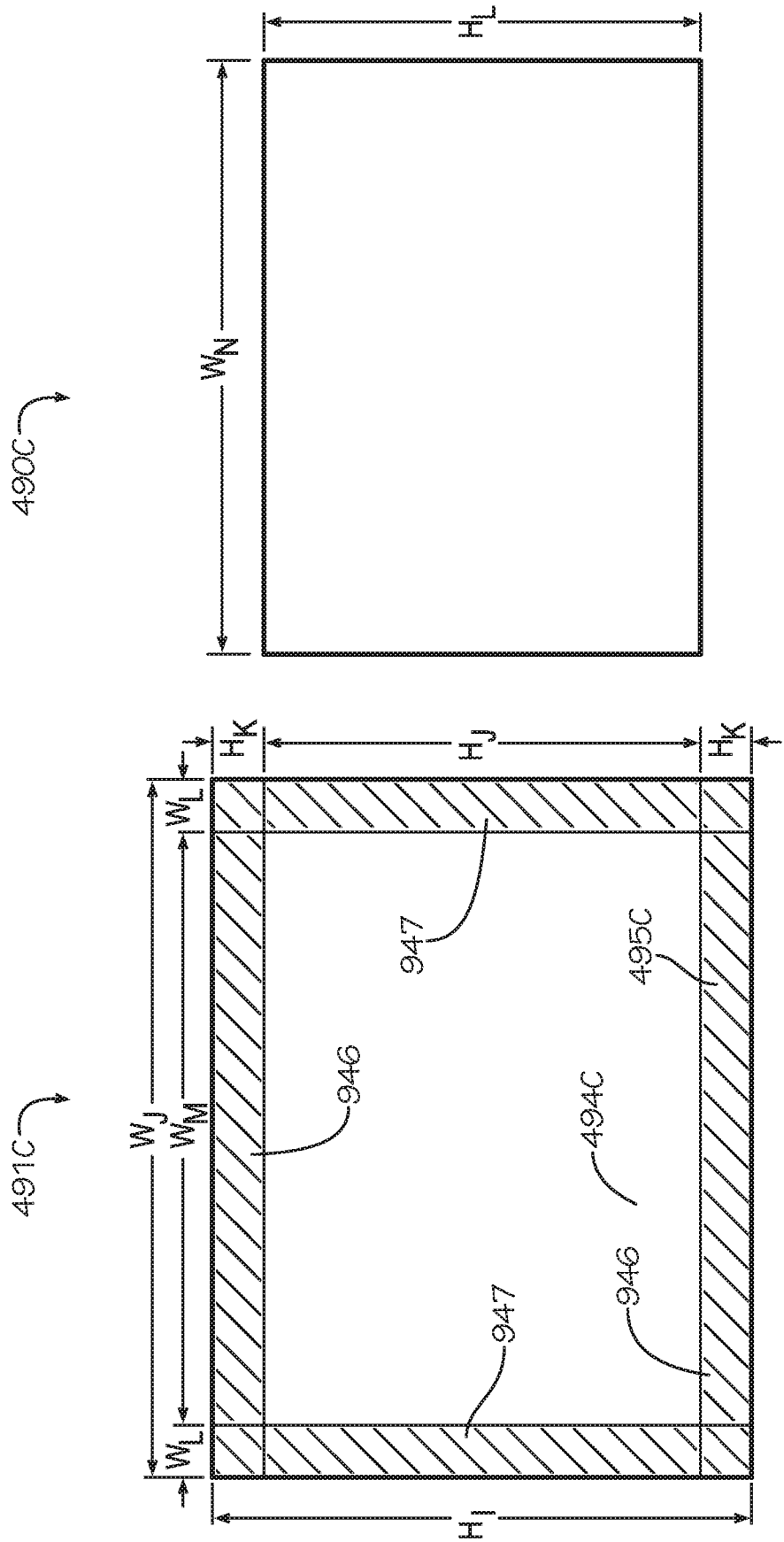
FIG. 9 is a top view of another aspect of the blank sheet and another aspect of the insulation batt for the insulated panel of FIG. 3A.

FIG. 9 is a top view of another aspect of a blank sheet 491C and another aspect of an insulation batt 490C for the insulated panels 130 of FIG. 3A. The blank sheet 491C can define a width $W_J$ and a height $H_I$. The panel border 333 of the insulated panels 130 can be formed by attaching two perimeter portions 495C of two separate blank sheets 491C together in facing engagement. The interior portion 494C can define a width $W_M$ and a height $H_J$. With two blank sheets 491C aligned and attached in facing engagement, the interior portions 494C can define the panel cavity (not shown) which can contain the insulation batt 490C.

The perimeter portion 495C can define a pair of first panel border portions 946 and a pair of second panel border portions 947. The second panel border portions 947 can each define a width $W_L$, and the first panel border portions 946 can each define a height $H_K$. In the present aspect, the width $W_G$ and the height $H_F$ can define values which can be substantially the same.

The insulation batt 490C can define a width $W_N$ and a height $H_L$ which can each define a value substantially the same or slightly less, for example and without limitation 1" less, than the width $W_M$ and height $H_J$, respectively. This sizing allows the insulation batt 490C to fit within the panel cavity (not shown) defined between two blank sheets 491C. Sizing the insulation batt 490C slightly smaller than the interior portion 494C can provide clearance for the thickness of the insulation batt 490C, particularly in embodiments in which the insulation batt 490C defines a large thickness such as ½" or greater.

In some aspects, such as when the insulated panel 130 corresponding to the blank sheet 491C is the top panel 131, the width $W_J$ and the height $H_I$ can be sized complimentary to the size and shape of the liner opening 148. In this aspect, the width $W_J$ can define a value substantially the same as the width $W_C$ of the main subpanel portion 742 of blank sheet 491A. In aspects in which the side seam 143 is a lap seam, the height $H_I$ can define a value substantially the same as the combination of the width $W_E$ of the side portion 743 and the widths $W_B$ of the two side subpanel portions 744. These widths can correspond to a combined width of the two side subpanels 144 and the side seam 143 which can together define a one of the side liner panels 145 as shown in FIG. 2B.

In other aspects in which the side seam 143 is a plain seam, the height $H_I$ can have substantially the same value as twice the widths $W_B$ of the two side subpanel portions 744. In aspects in which the insulated panel 130 is the divider panel 431 or the floor panel 432 as shown in FIG. 4A, the width $W_J$ and the height $H_I$ can be sized slightly smaller than the liner opening 148 to accommodate the thickness of the insulation batt 490A of the blank liner panels 141.

A method of assembling the insulated box assembly 100 can comprise configuring the insulated liner 140 in the collapsed installation configuration, aligning the insulated liner 140 with the box opening 120 of the box 110, inserting the insulated liner 140 into the internal box cavity 122, and configuring the insulated liner 140 to the expanded configuration. Configuring the insulated liner 140 in the collapsed insertion configuration can comprise folding the side liner panels 145 inwards towards the liner cavity 150, collapsing the main liner panels 147 inwards towards the liner cavity 150, and folding the liner bottom 149. Configuring the insulated liner 140 to the expanded configuration can comprise expanding the main liner panels 147 away from the liner cavity 150, unfolding the side liner panels 145 outwards from the liner cavity 150, and unfolding the liner bottom 149. Configuring the insulated liner 140 to the expanded configuration can further comprise self-expanding the insulated liner 140 with the force $F_2,F_3$ exerted by the positional memory of the insulated liner. Configuring the insulated liner 140 to the expanded configuration can further comprise positioning a one of the main liner panels 147, the side liner panels 145, and the liner bottom 149 in facing engagement with a one of the main box panels 112, the side box panels 114, and the box bottom panel 413. The method can further comprise covering the liner opening 148 with the insulated panel 130 and forming the seal between the insulated panel 130 and the insulated liner 140.

In the present aspect, the blank sheets 491 can comprise paper, such as kraft paper; however, in other embodiments, the blank sheets 491 can comprise posterboard, cardboard, plastic sheeting, cloth, or any other suitable material. In some aspects, the pair of blank sheets 491 can each comprise a different material. In some aspects, the blank sheets 491 can be a water-proof or water-resistant material, such as water-resistant kraft paper. The insulation batt 490 can comprise paper or other paper fiber materials; however, in other aspects, the insulation batt 490 can comprise cotton, foam, rubber, plastics, fiberglass, mineral wool, or any other flexible insulation material. In the present application, the insulation batt 490 can be repulpable. In the present aspect, the insulated box assembly 100 can be 100% recyclable. In the present aspect, the insulated box assembly 100 can be single-stream recyclable wherein all materials comprised by the insulated box assembly can be recycled by a single processing train without requiring separation of any materials. In some aspects, only the insulated liner 140 can be single-stream recyclable. In the present aspect, the insulated box assembly 100 can be compostable. In the present aspect, the insulated box assembly 100 can be repulpable. In the present aspect, insulated box assembly 100 and each of the box 110, the insulated liner 140, and the insulated panel 130 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill., which is hereby incorporated by reference in its entirety. In the present aspect, insulated box assembly 100 and each of the box 110, the insulated liner 140, and the insulated panel 130 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. In some aspects, the insulated box assembly 100 can be biodegradable.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The insulated box assembly 100 can be used in applications in which a user or mail carrier transports perishable or temperature-sensitive goods or contents. For example and without limitation, the insulated box assembly 100 can be used to transport groceries or medications. In some applications, a material such as ice, dry ice, or a freeze pack can be placed in the liner cavity 150 to maintain a temperature of goods for longer durations. Alternatively, the insulated box assembly 100 can be used to transport warm contents, such as takeout delivery of freshly-prepared food. In such applications, a heat pack or other heat source can be placed within the liner cavity to keep contents of the insulated box assembly 100 warm.

Many forms of packaging and insulation are not accepted by many recycling facilities or curb-side recycling programs in which a waste management service collects recyclables at a user's home. Examples such as bubble wrap or plastic-wrapped insulations may not be accepted. In some aspects, the insulated box assembly 100 can reduce waste and pollution by comprising materials which are recyclable or biodegradable. In aspects in which the insulated box assembly 100 is curb-side or single-stream recyclable, the user may be more likely to recycle the insulated box assembly 100 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulated box assembly comprising:
   a box comprising a pair of opposing side box panels, a pair of opposing main box panels, and a bottom box panel, the box defining an internal box cavity with a box opening defined opposite from the bottom box panel; and
   an insulated liner positioned within the internal box cavity, the insulated liner comprising a pair of opposing main liner panels and a pair of opposing side liner panels, the pair of opposing main liner panels comprising a first main liner panel and a second main liner panel, the pair of opposing side liner panels comprising a first side liner panel and a second side liner panel, the first side liner panel being hingedly coupled to the first main liner panel at a first side crease line, the first side liner panel being hingedly coupled to the second main liner panel at a second side crease line, the first side liner panel being unfolded between the first side crease line and the second side crease line, the first side crease line and the second side crease line being positioned perpendicular to the bottom box panel, the pair of opposing main liner panels and the pair of opposing side liner panels defined by a single blank liner panel comprising a blank sheet and an insulation batt, the insulation batt positioned between the blank sheet and the box.

2. The insulated box assembly of claim 1, wherein the second side liner panel is hingedly coupled to the second main liner panel at a third side crease line.

3. The insulated box assembly of claim 2, wherein the insulated liner defines a top end and a bottom end, and wherein the first side crease line, the second side crease line, and the third side crease line extend between the top end and the bottom end.

4. The insulated box assembly of claim 2, wherein the insulation batt defines a groove corresponding to the first side crease line, and wherein a thickness of the insulation batt is reduced at the groove.

5. The insulated box assembly of claim 2, wherein the second main liner panel is unfolded between the second side crease line and the third side crease line.

6. The insulated box assembly of claim 1, wherein:
   the insulated liner defines a liner cavity with a liner opening positioned at a top end of the insulated liner; and
   the blank sheet at least partially defines the liner cavity.

7. The insulated box assembly of claim 6, further comprising an insulated panel covering the liner opening, the insulated panel comprising a panel sheet and a panel insulation batt, the panel sheet further defining the liner cavity.

8. The insulated box assembly of claim 7, wherein the panel sheet is positioned between the panel insulation batt and the insulation batt of the single blank liner panel.

9. The insulated box assembly of claim 1, wherein:
   the insulated liner defines a liner cavity with a liner opening positioned at a top end of the insulated liner;
   a bottom liner panel is positioned at a bottom end of the insulated liner opposite from the opening; and
   the bottom liner panel further defines the liner cavity.

10. The insulated box assembly of claim 9, wherein the bottom liner panel is defined by the single blank liner panel.

11. The insulated box assembly of claim 1, wherein the insulation batt comprises paper.

12. The insulated box assembly of claim 1, wherein the insulation batt is repulpable.

13. The insulated box assembly of claim 1, wherein the insulation batt is recyclable.

14. The insulated box assembly of claim 1, wherein the insulation batt comprises a mixture of cellulose fiber and between 0.5% and 25% thermoplastic binder fiber.

15. The insulated box assembly of claim 14, wherein the single blank liner panel is repulpable.

16. The insulated box assembly of claim 14, wherein the thermoplastic binder fiber comprises a polyethylene and polypropylene mixture.

17. The insulated box assembly of claim 14, wherein the thermoplastic binder fiber has a length of between 0.5 mm to 16 mm.

18. The insulated box assembly of claim 1, wherein the blank sheet comprises kraft paper.

19. The insulated box assembly of claim 1, wherein the insulation batt comprises cardboard.

\* \* \* \* \*